United States Patent [19]

Maeda et al.

[11] Patent Number: 5,515,180
[45] Date of Patent: May 7, 1996

[54] IMAGE PROCESSING DEVICE

[75] Inventors: Hiroshi Maeda, Kashihara; Toshio Yamagishi, Nara; Norihide Kunikawa, Yao; Toshihiro Okahashi, Kashihara; Tatsuya Itoh, Nara; Masatsugu Nakamura, Koshiba, all of Japan

[73] Assignee: Sharp Kabushiki Kaisha, Japan

[21] Appl. No.: 152,975

[22] Filed: Nov. 16, 1993

[30] Foreign Application Priority Data

Nov. 24, 1992 [JP] Japan .................... 4-336642
Nov. 30, 1992 [JP] Japan .................... 4-345393
Mar. 10, 1993 [JP] Japan .................... 5-077712

[51] Int. Cl.$^6$ ..................... H04N 1/40
[52] U.S. Cl. ............ 358/458; 358/459; 358/455; 358/465; 358/448; 358/447
[58] Field of Search ............. 358/455, 448, 358/451, 456, 447, 445, 454, 557, 458, 459, 535, 428, 248, 462, 463, 465, 466, 467; 382/44, 45, 47; 347/14, 15

[56] References Cited

U.S. PATENT DOCUMENTS 4,638,369  1/1987  Hsieh .................... 358/455
5,144,687  9/1992  Honda .................... 358/455
5,299,030  3/1994  Kim ..................... 358/455

Primary Examiner—Edward L. Coles, Sr.
Assistant Examiner—Fan Lee

[57] ABSTRACT

The present invention is made to reduce the effect of variation of pulses for driving a printer when recording image data and to improve the gray level representation of picture images to be printed. Data incoming through an image reading device are quantized and processed two pixels at a time by a gray level image processing circuit. The two-pixels' data are first discriminated by an edge discriminator to determine whether they represent an edge portion within the image or not. An object image, on which an operation for inter-pixel spacing shall be conducted, is selected according to the discrimination result. The arithmetic and logic portion performs the above-mentioned operation by two pixels at a time if the data correspond to a non-edge portion and performs correction for enhancement if the data correspond to an edge. This may eliminate the effect of dot displacement due to variation of drive pulses of a printer and improve the quality, in particular, of a gray level image portion.

17 Claims, 34 Drawing Sheets

HORIZONTAL SCANNING DIRECTION
(DIRECTION OF PROCESSING)

| E | F | A | B | C | D |
|---|---|---|---|---|---|
| 0 | 0 | 1 |   |   |   |
|   | 0 | 2 |   |   |   |
|   | 0 | 3 |   |   |   |
|   |   | 2 | 0 |   |   |
|   |   | 3 | 0 |   |   |
|   |   |   | 1 | 0 | 0 |
|   |   |   | 2 | 0 |   |
|   |   |   | 3 | 0 |   |
|   |   | 1 | 0 | 0 |   |

ATTENTIONAL PIXELS: A, B
SUBSEQUENT ATTENTIONAL PIXELS: C, D 0 (WHITE)
1
2
3 (BLACK)

HORIZONTAL SCANNING DIRECTION
(DIRECTION OF PROCESSING)

FIG.15A

HORIZONTAL SCANNING DIRECTION →

| 0 | 0 | 0 | 0 | 0 | 0 | 0 | 0 | 0 | 0 |
|---|---|---|---|---|---|---|---|---|---|
| 0 | 1 | 1 | 1 | 1 | 1 | 1 | 1 | 1 | 0 |
| 0 | 1 | 1 | 2 | 1 | 1 | 1 | 2 | 1 | 0 |
| 0 | 1 | 1 | 1 | 1 | 2 | 1 | 1 | 1 | 0 |
| 0 | 1 | 2 | 1 | 1 | 1 | 1 | 1 | 1 | 0 |
| 0 | 1 | 1 | 1 | 1 | 2 | 1 | 1 | 2 | 0 |
| 0 | 1 | 1 | 1 | 2 | 1 | 1 | 1 | 1 | 0 |
| 0 | 1 | 2 | 1 | 1 | 1 | 1 | 1 | 1 | 0 |
| 0 | 1 | 1 | 1 | 1 | 2 | 1 | 1 | 0 | |
| 0 | 1 | 1 | 1 | 2 | 1 | 1 | 1 | 2 | 0 |

FIG.15B

| 0 | 0 | 0 | 0 | 0 | 0 | 0 | 0 | 0 | 0 |
|---|---|---|---|---|---|---|---|---|---|
| 0 | 1 | 0 | 2 | 0 | 2 | 0 | 2 | 0 | 1 |
| 0 | 1 | 0 | 3 | 0 | 2 | 0 | 3 | 0 | 1 |
| 0 | 1 | 0 | 2 | 0 | 3 | 0 | 2 | 0 | 1 |
| 0 | 1 | 0 | 3 | 0 | 2 | 0 | 2 | 0 | 1 |
| 0 | 1 | 0 | 2 | 0 | 3 | 0 | 2 | 0 | 2 |
| 0 | 1 | 0 | 2 | 0 | 3 | 0 | 2 | 0 | 1 |
| 0 | 1 | 0 | 3 | 0 | 2 | 0 | 2 | 0 | 1 |
| 0 | 1 | 0 | 2 | 0 | 2 | 0 | 3 | 0 | 1 |
| 0 | 1 | 0 | 2 | 0 | 3 | 0 | 2 | 0 | 2 |

FIG.16A

HORIZONTAL SCANNING DIRECTION →

| 0 | 0 | 0 | 0 | 0 | 0 | 0 | 0 | 0 | 0 |
|---|---|---|---|---|---|---|---|---|---|
| 0 | 1 | 1 | 1 | 1 | 0 | 0 | 0 | 0 | 0 |
| 0 | 1 | 1 | 2 | 1 | 0 | 0 | 0 | 0 | 0 |
| 0 | 1 | 1 | 1 | 1 | 0 | 0 | 0 | 0 | 0 |
| 0 | 1 | 2 | 1 | 1 | 0 | 0 | 0 | 0 | 0 |
| 0 | 1 | 1 | 1 | 1 | 0 | 0 | 0 | 0 | 0 |
| 0 | 1 | 1 | 1 | 2 | 0 | 0 | 0 | 0 | 0 |
| 0 | 1 | 2 | 1 | 1 | 0 | 0 | 0 | 0 | 0 |
| 0 | 1 | 1 | 1 | 1 | 0 | 0 | 0 | 0 | 0 |
| 0 | 1 | 1 | 1 | 2 | 0 | 0 | 0 | 0 | 0 |

FIG.16B

| 0 | 0 | 0 | 0 | 0 | 0 | 0 | 0 | 0 | 0 |
|---|---|---|---|---|---|---|---|---|---|
| 0 | 1 | 0 | 2 | 1 | 0 | 0 | 0 | 0 | 0 |
| 0 | 1 | 0 | 3 | 1 | 0 | 0 | 0 | 0 | 0 |
| 0 | 1 | 0 | 2 | 1 | 0 | 0 | 0 | 0 | 0 |
| 0 | 1 | 0 | 3 | 1 | 0 | 0 | 0 | 0 | 0 |
| 0 | 1 | 0 | 2 | 1 | 0 | 0 | 0 | 0 | 0 |
| 0 | 1 | 0 | 2 | 2 | 0 | 0 | 0 | 0 | 0 |
| 0 | 1 | 0 | 3 | 1 | 0 | 0 | 0 | 0 | 0 |
| 0 | 1 | 0 | 2 | 1 | 0 | 0 | 0 | 0 | 0 |
| 0 | 1 | 0 | 2 | 2 | 0 | 0 | 0 | 0 | 0 |

↑ SAVE EDGE

FIG.16C

| 0 | 0 | 0 | 0 | 0 | 0 | 0 | 0 | 0 | 0 |
|---|---|---|---|---|---|---|---|---|---|
| 0 | 2 | 2 | 2 | 2 | 0 | 0 | 0 | 0 | 0 |
| 0 | 2 | 2 | 3 | 2 | 0 | 0 | 0 | 0 | 0 |
| 0 | 2 | 2 | 2 | 2 | 0 | 0 | 0 | 0 | 0 |
| 0 | 2 | 0 | 3 | 2 | 0 | 0 | 0 | 0 | 0 |
| 0 | 2 | 0 | 2 | 2 | 0 | 0 | 0 | 0 | 0 |
| 0 | 2 | 0 | 2 | 2 | 0 | 0 | 0 | 0 | 0 |
| 0 | 2 | 3 | 2 | 2 | 0 | 0 | 0 | 0 | 0 |
| 0 | 2 | 2 | 2 | 2 | 0 | 0 | 0 | 0 | 0 |
| 0 | 2 | 2 | 2 | 3 | 0 | 0 | 0 | 0 | 0 |

↑ SAVE EDGE

HORIZONTAL SCANNING DIRECTION →

| 0 | 0 | 0 | 0 | 0 | 0 | 0 | 0 | 0 | 0 |
|---|---|---|---|---|---|---|---|---|---|
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 1 | 2 | 2 | 1 | 0 | 0 | 0 |
| 0 | 0 | 0 | 1 | 2 | 2 | 1 | 0 | 0 | 0 |
| 0 | 0 | 1 | 2 | 3 | 3 | 2 | 1 | 0 | 0 |
| 0 | 0 | 1 | 2 | 3 | 3 | 2 | 1 | 0 | 0 |
| 0 | 1 | 1 | 1 | 2 | 1 | 1 | 1 | 1 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

| 0 | 0 | 0 | 0 | 0 | 0 | 0 | 0 | 0 | 0 |
|---|---|---|---|---|---|---|---|---|---|
| 0 | 0 | 0 | 0 | 2 | 2 | 0 | 0 | 0 | 0 |
| 0 | 0 | 0 | 0 | 2 | 2 | 0 | 0 | 0 | 0 |
| 0 | 0 | 0 | 2 | 3 | 3 | 2 | 0 | 0 | 0 |
| 0 | 0 | 0 | 2 | 3 | 3 | 2 | 0 | 0 | 0 |
| 0 | 0 | 2 | 3 | 3 | 3 | 3 | 2 | 0 | 0 |
| 0 | 0 | 2 | 3 | 3 | 3 | 3 | 2 | 0 | 0 |
| 0 | 2 | 2 | 2 | 3 | 2 | 2 | 2 | 2 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

☐ NON-EDGE PORTION
▨ EDGE PORTION

TONAL DENSITY 90
(BY CONVENTIONAL
METHOD)

<10> <01>

TONAL DENSITY 90
(BY THE PROPOSED
METHOD)

<10> <11>

**HORIZONTAL SCANNING DIRECTION
(DIRECTION OF PROCESSING)**

FIG.20

| J | K | A | G | H | I |
|---|---|---|---|---|---|
| 0 | 0 | 1 |   |   |   |
|   | 0 | 2 |   |   |   |
|   | 0 | 3 |   |   |   |
|   |   | 0 | 2 |   |   |
|   |   | 0 | 3 |   |   |
|   |   |   | 1 | 0 | 0 |
|   |   |   | 2 | 0 |   |
|   |   |   | 3 | 0 |   |
|   | 0 | 0 | 1 |   |   |

0 (WHITE)
1
2
3 (BLACK)

EDGE PATTERN CONDITION IN DIRECTION OF VERTICAL SCANNING (FEED)

FIG.22A

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 2 | 0 | 0 | 0 | 0 | 2 | 0 | 0 | 0 |
| 0 | 0 | 0 | 3 | 0 | 0 | 0 | 0 | 2 | 0 | 0 | 0 |
| 0 | 0 | 0 | 2 | 0 | 0 | 0 | 0 | 2 | 0 | 0 | 0 |
| 0 | 0 | 0 | 2 | 0 | 0 | 0 | 0 | 2 | 0 | 0 | 0 |
| 0 | 0 | 0 | 3 | 0 | 0 | 0 | 2 | 0 | 3 | 0 | 0 |
| 0 | 0 | 0 | 2 | 0 | 0 | 0 | 0 | 2 | 0 | 0 | 0 |
| 0 | 0 | 0 | 2 | 0 | 0 | 0 | 0 | 2 | 0 | 0 | 0 |
| 0 | 0 | 0 | 3 | 0 | 0 | 0 | 0 | 2 | 0 | 0 | 0 |
| 0 | 0 | 0 | 2 | 0 | 0 | 0 | 0 | 2 | 0 | 0 | 0 |

FIG.22B

| 0 | 0 | 0 | 0 | 0 | 0 | 0 | 0 | 0 | 0 | 0 | 0 |
|---|---|---|---|---|---|---|---|---|---|---|---|
| 0 | 0 | 1 | 1 | 0 | 0 | 0 | 0 | 2 | 0 | 0 | 0 |
| 0 | 0 | 2 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 1 | 1 | 0 | 0 | 1 | 1 | 1 | 2 | 0 | 0 |
| 0 | 0 | 1 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 2 | 1 | 0 | 0 | 0 | 0 | 2 | 0 | 0 | 0 |
| 0 | 0 | 1 | 1 | 0 | 0 | 0 | 0 | 2 | 0 | 0 | 0 |

FIG.22C

| 0 | 0 | 0 | 0 | 0 | 0 | 0 | 0 | 0 | 0 | 0 | 0 |
|---|---|---|---|---|---|---|---|---|---|---|---|
| 0 | 0 | 1 | 1 | 0 | 0 | 0 | 0 | 2 | 0 | 0 | 0 |
| 0 | 0 | 2 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 1 | 1 | 0 | 0 | 1 | 1 | 1 | 2 | 0 | 0 |
| 0 | 0 | 1 | 1 | 0 | 0 | 0 | 0 | 2 | 0 | 0 | 0 |
| 0 | 0 | 1 | 1 | 0 | 0 | 0 | 0 | 2 | 0 | 0 | 0 |
| 0 | 0 | 2 | 1 | 0 | 0 | 0 | 0 | 2 | 0 | 0 | 0 |
| 0 | 0 | 1 | 1 | 0 | 0 | 0 | 0 | 2 | 0 | 0 | 0 |

FIG.31A

| 0 | 0 | 0 | 0 | 0 | 0 | 0 | 0 | 0 | 0 |
|---|---|---|---|---|---|---|---|---|---|
| 0 | 1 | 1 | 1 | 1 | 1 | 1 | 1 | 1 | 0 |
| 0 | 1 | 1 | 2 | 1 | 1 | 1 | 2 | 1 | 0 |
| 0 | 1 | 1 | 1 | 1 | 2 | 1 | 1 | 1 | 0 |
| 0 | 1 | 2 | 1 | 1 | 1 | 1 | 1 | 1 | 0 |
| 0 | 1 | 1 | 1 | 1 | 2 | 1 | 1 | 2 | 0 |
| 0 | 1 | 1 | 1 | 2 | 1 | 1 | 1 | 1 | 0 |
| 0 | 1 | 2 | 1 | 1 | 1 | 1 | 1 | 1 | 0 |
| 0 | 1 | 1 | 1 | 1 | 1 | 2 | 1 | 1 | 0 |
| 0 | 1 | 1 | 1 | 2 | 1 | 1 | 1 | 2 | 0 |

FIG.31B

| 0 | 0 | 0 | 0 | 0 | 0 | 0 | 0 | 0 | 0 |
|---|---|---|---|---|---|---|---|---|---|
| 0 | 1 | 1 | 1 | 1 | 1 | 1 | 1 | 1 | 0 |
| 0 | 1 | 0 | 1 | 0 | 1 | 0 | 1 | 0 | 0 |
| 0 | 1 | 1 | 1 | 1 | 1 | 1 | 1 | 1 | 0 |
| 0 | 1 | 0 | 1 | 0 | 1 | 1 | 0 | 1 | 0 |
| 0 | 1 | 1 | 1 | 1 | 1 | 1 | 1 | 1 | 0 |
| 0 | 1 | 1 | 0 | 1 | 0 | 1 | 0 | 1 | 0 |
| 0 | 1 | 0 | 1 | 1 | 1 | 1 | 1 | 1 | 0 |
| 0 | 1 | 1 | 1 | 1 | 1 | 0 | 1 | 1 | 0 |
| 0 | 1 | 0 | 1 | 0 | 1 | 1 | 0 | 0 | 0 |

FIG.31C

| 0 | 0 | 0 | 0 | 0 | 0 | 0 | 0 | 0 | 0 |
|---|---|---|---|---|---|---|---|---|---|
| 0 | 2 | 3 | 2 | 3 | 2 | 3 | 2 | 2 | 0 |
| 0 | 2 | 2 | 2 | 2 | 2 | 3 | 2 | 2 | 0 |
| 0 | 3 | 2 | 3 | 3 | 2 | 3 | 2 | 2 | 0 |
| 0 | 2 | 3 | 2 | 2 | 2 | 3 | 2 | 2 | 0 |
| 0 | 2 | 2 | 2 | 3 | 3 | 2 | 2 | 3 | 0 |
| 0 | 2 | 3 | 2 | 2 | 3 | 2 | 2 | 2 | 0 |
| 0 | 2 | 3 | 2 | 3 | 2 | 2 | 3 | 2 | 0 |
| 0 | 2 | 2 | 3 | 2 | 3 | 2 | 2 | 3 | 0 |
| 0 | 3 | 2 | 2 | 2 | 2 | 3 | 2 | 2 | 0 |

FIG.31D

| 0 | 0 | 0 | 0 | 0 | 0 | 0 | 0 | 0 | 0 |
|---|---|---|---|---|---|---|---|---|---|
| 0 | 2 | 2 | 2 | 2 | 2 | 2 | 2 | 2 | 0 |
| 0 | 2 | 2 | 2 | 2 | 2 | 2 | 2 | 2 | 0 |
| 0 | 2 | 2 | 3 | 2 | 2 | 2 | 3 | 2 | 0 |
| 0 | 2 | 2 | 2 | 2 | 2 | 2 | 2 | 2 | 0 |
| 0 | 2 | 2 | 2 | 2 | 3 | 2 | 2 | 2 | 0 |
| 0 | 2 | 2 | 2 | 2 | 2 | 2 | 3 | 2 | 0 |
| 0 | 2 | 2 | 3 | 2 | 2 | 2 | 2 | 2 | 0 |
| 0 | 2 | 2 | 2 | 2 | 2 | 2 | 2 | 2 | 0 |
| 0 | 2 | 2 | 2 | 2 | 2 | 3 | 2 | 2 | 0 |

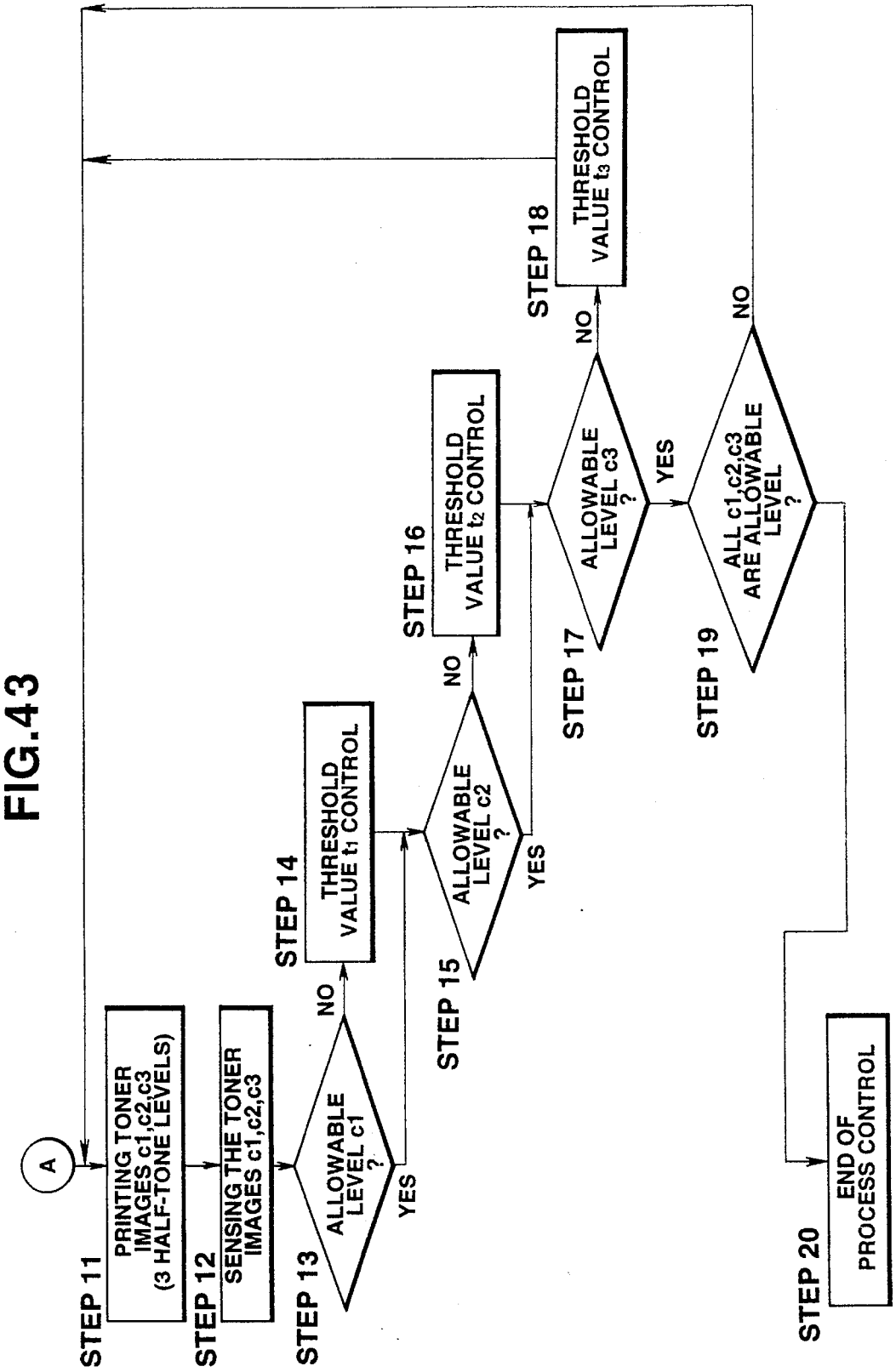

IMAGE PROCESSING DEVICE

BACKGROUND OF THE INVENTION

The present invention relates to a image processing device and more particularly to a gray level image processor which is capable of improving the quality of print of a gray level image by processing the quantized image data by performing operations on interpixel spacing and which includes a pseudo gray level image processing device capable of varying thresholds according to original images and environmental conditions and which is intended for use in, e.g., digital copying machines, facsimiles, printers and so on.

In the case of the conventional processing of gray level images, quantized image data is directly printed out. For instance, image data input in digital form contains information of the pixels, each having a gray level in the range of, e.g., 0 to 255. This means that a stream of 8 bits is required to represent each pixel of gray level in the range of 0 to 255 if no additional processing is made. A tremendous memory capacity may be required to store whole image data. In addition, there must be a printer which is capable of reproducing images of gray levels varying from 0 to 255. In order to reproduce scanned images of such gray levels by printers having a low memory capacity and a relatively low power for reproducing the gray shades of an image, it is necessary to reduce the amount of information to be carried by a pixel and to decrease the number of gray shades in each pixel.

The processing procedure begins with reading image data containing pixels having gray levels of 0 to 255. The read-in data is quantized for the gray levels of 0 to 255.

For instance, the gray levels (0 to 255) of the data are quantized at points W, X, Y and Z. The quantization is made to discriminate the input data "f" with reference to preset thresholds t1, t2 and t3 as follows:

W if $255 \geq f > t1$;

X if $t1 \geq f > t2$;

Y if $t2 \geq f > t3$;

Z if $t3 \geq f \geq t0$.

However, the quantized image data only may not faithfully represent the gray levels of the local areas in an original and may lack the gradual passing of one shade to another within an image. To eliminate the above-mentioned defects, differences of tonal densities between the image and the original, which occurred in the quantization process, is detected as an error that is processed to give the effect of tonal densities in pixels around an attentional one. Thus processed, quantized image data can more convincingly represent the gray levels in the details of an original image.

An original image is optically scanned by exposing the system of an original image scanner and the reflected light from the original image creates an image on a charge coupled device (CCD) by which it is converted into analog voltage signals corresponding to the tonal densities of pixels of that image. These analog signals are converted by an A-D converter into digital signals that are corrected for various parameters and then output as digital signals each of which, e.g., 8 bits representing tonal densities (up to 256 shades) of corresponding pixels. These digital signals are used for turning a laser output portion ON and OFF. It converts the digital signals into light image signals again to be recorded by an image recorder. However, the reproduction of 256-gradational representations of each pixel of the image requires a very large amount of storage, which makes it of no practical use. Therefore, the 256-gradational (8 bits per pixel) quantized information is converted into, e.g., 4-gradational (2 bits per pixel) quantized information that may be simply restricted by specific thresholds.

As described above, the conventional device has no means to selectively use a plurality of processing modes according to the kinds of original images to be processed and therefore may give only a fixed gradational representation using fixed quantized values and thresholds. In short, since a processed image may have a fixed gray level representation independent of other kinds of original images, it is necessary to adjust the gray levels of the image data by varying the ON-OFF duration of its exposure to laser light according to preset laser values.

The above-mentioned prior art will be further described in detail as follows:

Input data is read by the image reading unit as digital information representing pixels each having gray levels of up to 256. Quantizing values and thresholds for converting high gradation data (256 gray levels per pixel) into low gradation data is then determined. The data on the gray levels of 0 to 255 are divided into 4 quantized values A, B, C and D (representative of the gray levels) and a threshold between the quantized values A and B is defined as t1. Similarly, the threshold between the quantized values B and C and the threshold between C and D are defined as t2 and t3 respectively. Laser (images) gradation is set to represent half-tone image by changing the binary surface area.

As described above, the prior art has such drawbacks that it performs quantization of gray level image data by using fixed quantizing values and fixed thresholds and, thereby, requires changing laser ON time per pixel representing laser gradation to change the surface gray level of an image printable by an image recorder; and it is hardly adaptable to possible changes in environmental conditions such as changes in the luminosity of an exposure lamp with the time of use.

The Japanese publication of examined application JP 61-29502 discloses an image stabilizing device that previously measured gray levels of toner images of a dark portion (without being exposed) and a light portion (exposed to light of a specified intensity) produced on a light-sensitive material by an optical densitometer and performs the control of the electrophotographic(xerographic) process to create an electrostatic latent image by regulating the charged voltage put out on the basis of a dark portion toner image and by regulating the exposure conditions or a bias voltage for toner image development.

The Japanese publication of unexamined application JP 1-97065 discloses a facsimile device which includes a plurality of half-tone image processing circuits having different characteristics and which selectively uses these circuits each for the most suitable purpose of achieving a high grade of performance.

As mentioned above, the conventional gray level image processing method allows to directly print only quantized data of a gray level image whose gradation is represented by dot size of a dot-matrix of the printer portion. Consequently, the quantized dotted image representation may be random and contain separated, closed or joined dots therein when the dots are laid in different positions due to a variation in printer driving pulses. In other words, it may be easily effected by other factors than image processing.

There is shown by dotted lines a relationship between gray level values of 0 to 255 and tonal densities of a copy image in the case of a conventional method. The problem exists in that the copy image may vary absurdly in tonal density and thereby cannot smoothly represent a gray level image. In addition, there is still another problem, that a conventional circuit for gray level image processing does not include the discrimination of the edge and non edge areas of an image, thereby separately correcting only the gray level.

As mentioned above, the conventional gray level image processing method performs the quantization of gray level image data using fixed quantizing values and fixed thresholds and, therefore requires complicated settings of laser side gradation to adjust the gray levels of the image to be reproduced. It is difficult to attain optimal gray levels according to those kinds of originals. It is also difficult to be optimally correct for the possible deviation of the gray levels of an image due to changes in the environmental conditions, e.g., a change in the luminosity of an exposure lamp with the time of use.

The image stabilizing device disclosed in the Japanese publication of examined application JP 61-29502 controls the electrophotographic(xerographic) process according to signals of a light portion and dark portion of a toner image and therefore can perform adjustments of gray level only at one set point. However, it is incapable of separately adjusting two or more gray levels and of producing a high quality copy of an original image through the fine adjustment of its reproduce ability.

SUMMARY OF THE INVENTION

It is an object of the present invention to provide an image processing device which can perform gray level image processing with input data from an image reading device and operations on the quantized data at even intervals between pixels to reduce the effect of the variations of the printer's driving pulses during the image recording and to improve the printing quality of a gray level image, and which can detect the edge portions within the image according to the arrangement of the quantized data and switch over to an object image for the calculation of pixel intervals to improve the gray level representation of the printable image. The device is provided with a discriminator to discriminate whether the current image data is related to the edge portion or not. If so, calculations for its enhancement are performed and, if not, calculations to provide even inter-pixel spacing are preformed.

The problem relating to the deterioration of reproduced images, which may occur in the prior art devices i.e. directly printing out the image data as quantized in a gray level image processing circuit, can be solved by performing operations on the image data quantized in the gray level image processing circuit to arrange them at a constant interval of pixels. This process is effective to minimize the effect of the variation of spacing of pulses for driving a printer when recording the image data and to improve the gray level representation of a printed gray level image. The above-mentioned system can be realized only by providing the existing gray level image processing portion (without any modification) with an additional processing portion proposed by the present invention. In addition, application of an edge discriminator makes it possible to pass the data relating to an edge portion on an image without being processed and select object pixels to necessarily be processed. Furthermore, the present invention provides an edge discriminating method that determines the difference between the maximum and minimum quantized values of objects and adjacent pixels contained in evenly divided areas and then compares the difference in value with a fixed threshold value in both horizontal and vertical scanning directions to accurately distinguish between edge-portion pixels and non-edge portion pixels. This eliminates the occurrence of sticking and/or broken edges on reproduced images, which have been frequently seen in conventional cases. According to the present invention, it is possible to obtain a copy of an image faithfully representing an original image composed of both characters and photographs.

It is another object of the present invention to provide a image processing device which can selectively use two operation modes; one is a variable mode that can change quantizing values and thresholds for converting high-valued image gradation into low-valued image gradation so as to vary the surface gray levels of a printable image at a fixed laser gradation value of an image recording device; and another is a fixed mode that uses constant thresholds and quantizing values. This feature is effective to achieve easy operation and an increased quality of printed images by eliminating such drawbacks of the prior art that had only fixed quantizing values and thresholds and adjusted the gray levels of image by setting laser light gradations that required complicated operations and effected the quality of the printed images.

A change in currently read reference data can be sensed and compared with initially stored reference data and then quantizing values and thresholds can be corrected according to the compared result. This feature is useful to obtain the constant quality of printable images in spite of changes in the environment.

Reference toner images are created on a light-sensitive body and the tonal density of each image is optically measured. A charging output voltage is controlled at a fixed bias voltage for development until a specified gray level is obtained and then the potential difference between the bias voltage and the charging output voltage is determined. Absolute values of the charging output voltage and the bias voltage for development are adjusted keeping the fixed potential difference to obtain a specified black level. At least two gray levels between the specified high and low density levels can be adjusted by changing the quantizing values and thresholds. All these features are effective to obtain a stabilized and increased quality in reproduced images even in the case when ambient conditions have changed or a light-sensitive layer of the drum has been worn during a long period of use. Fine separate adjustments of two or more gray levels can be realized.

Image signals input through an image scanning unit are quantized for gray levels of pixels and the derived quantized image data is then processed by two pixels at a time. The two pixels are judged as to whether they relate to an edge portion of the image or not. The arithmetical operation for inter-pixel spacing is made on the data if it does not relate to the edge portion. If the data relates to the edge portion, it is corrected for enhancement purposes. The inter-pixel operation on quantized data is effective for reducing the effect of a deviation in the printer's driving pulses during an image recording and to improve the gray levels of an image to be reproduced by a printer. The pixels of the edge portions can be removed from the object of the inter-pixel operation and separately stored.

The discrimination of the edge is realized as follows:

An area that is larger than two attentional pixels, scanned in the processing direction, is presumed and divided into divisions in each of which a quantized value is determined. The difference between the maximal value and the minimal value is then determined. The two pixels are judged as the edge portion of an image in the processing direction if the differential value exceeds a specific one. On the contrary, the pixels are considered not to be the edge portion if the differential value is smaller than the specific one. A similar edge discrimination is made for one of two attentional pixels in the vertical scanning direction.

An original image transmitted through an optical exposure system is photoelectrically converted into analog voltage signals that are converted into digital image data containing pixels, each having a gray level of, e.g., 0 (white) to 255 (black) with a weight at a high level bit and further converted into digital image data with a weight at a low gray level of, e.g., 2 bits. This conversion has quantizing values and thresholds both of which can be selectively changed by images, keeping a constant laser area gradation. The deterioration of an image's quality, due to gray level changes, which may occur between the thresholds and the quantized data obtained at a low quantization level, is compensated by distributing the difference between the quantized data and the original data to pixels existing around attentional pixels. The effect of a change of luminosity of an exposure light source, which may occur over the time of operation or with a change in any ambient condition, is eliminated in such a way that a difference between proceeding (memorized) reference white levels and current reference white levels is calculated and quantizing values are determined according to a change in the reference value of the white level and then thresholds are changed accordingly.

In addition, a gray level of a reference toner image produced on a light-sensitive body is optically measured and, according to the results, three operations are conducted: the first operation for low tonal density side is to define the difference between a charging voltage and a bias voltage for toner image development in such a way as to make fog at ground level to be in an allowable range; the second step for a high tonal density side is to define absolute values of the bias voltage for toner image development and of the charging voltage keeping a constant difference therebetween in such a way to make high tonal density in an allowable range; and the final step is to independently change two or more thresholds and quantized values for gray level portions to stabilize the image's quality and to finely adjust the gray levels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWING

The present invention will become more fully understood from the detailed description given hereinbelow and the accompanying drawings which are given by way of illustration only, and thus, are not limitative of the present invention and wherein:

FIGS. 15A, 15B show data quantified by an embodiment for processing a gray level image according to the present invention in comparison with outputs obtained by conventional methods.

FIGS. 16A, 16B, 16C show data quantized by another embodiment for processing a gray level image according to the present invention in comparison with outputs obtained by conventional methods.

FIG. 20 shows a pattern for discriminating edges of an image scanned in a vertical scanning (feeding) direction.

FIGS. 22A, 22B, 22C are a view for explaining the effect of a gray-level-image processing device embodied in the present invention.

FIGS. 31A, 31B, 31C, 31D are a view for explaining an example of half-tone image processing according to the present invention when changing tonal densities of input signals in copying mode A and mode B.

FIG. 43 is a flow chart 2 for explaining another example of an image processing device according to the present invention.

PREFERRED EMBODIMENT OF THE INVENTION

In the case of the conventional processing of gray level images, quantized image data is directly printed out. For instance, image data input in digital form contains information of the pixels, each having a gray level in the range of, e.g., 0 to 255. This means that a stream of 8 bits is required to represent each pixel of gray level in the range of 0 to 255 if no additional processing is made. A tremendous memory capacity may be required to store whole image data. In addition, there must be a printer which is capable of reproducing images of gray levels varying from 0 to 255. In order to reproduce scanned images of such gray levels by printers having a low memory capacity and a relatively low power for reproducing the gray shades of an image, it is necessary to reduce the amount of information to be carried by a pixel and to decrease the number of gray shades in each pixel.

Figure 1:
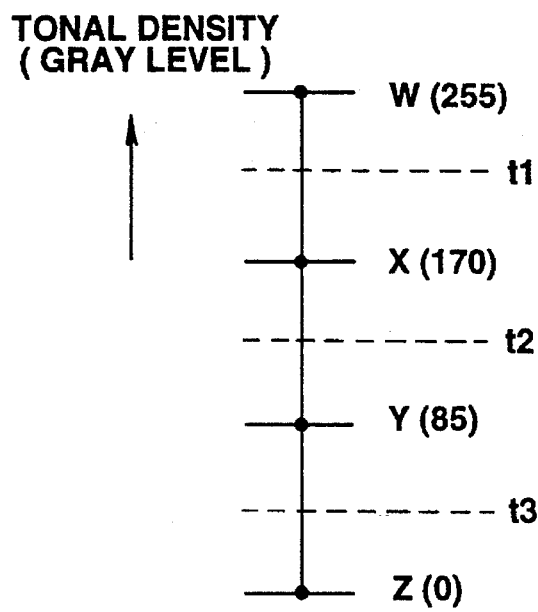
FIG. 1 is a view for explaining a conventional procedure of quantizing and processing an image data.

The processing procedure begins with reading image data containing pixels having gray levels of 0 to 255. As shown in FIG. 1, the read-in data is quantized for the gray levels of 0 to 255.

For instance, the gray levels (0 to 255) of the data are quantized at points W, X, Y and Z shown in FIG. 1. The quantization is made to discriminate the input data "f" with reference to preset thresholds t1, t2 and t3 as follows:

W if $255 \geq f > t1$;

X if $t1 \geq f > t2$;

Y if $t2 \geq f > t3$;

Z if $t3 \geq f > t0$.

Figure 2:
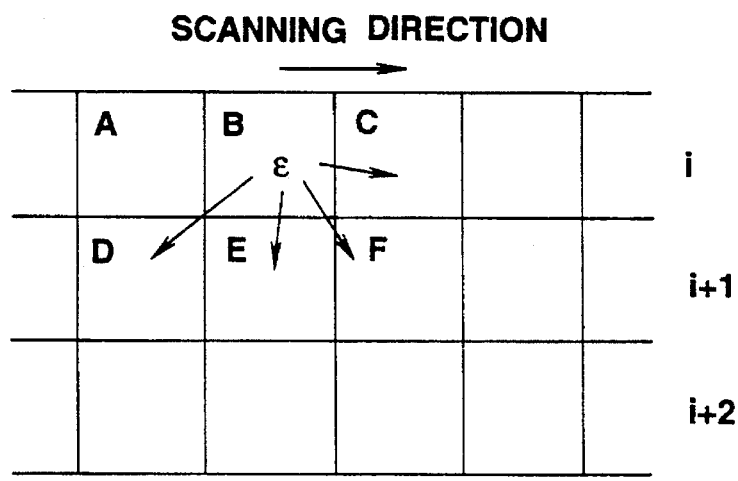
FIG. 2 is a view for explaining a conventional method for keeping the gray levels of an image.

However, the quantized image data only may not faithfully represent the gray levels of the local areas in an original and may lack the gradual passing of one shade to another within an image. As shown in FIG. 2, to eliminate the above-mentioned defects, differences of tonal densities between the image and the original, which occurred in the quantization process, is detected as an error that is processed to give the effect of tonal densities in pixels around an attentional one pixel B. Thus processed, quantized image data can more convincingly represent the gray levels in the details of an original image.

Figure 3:
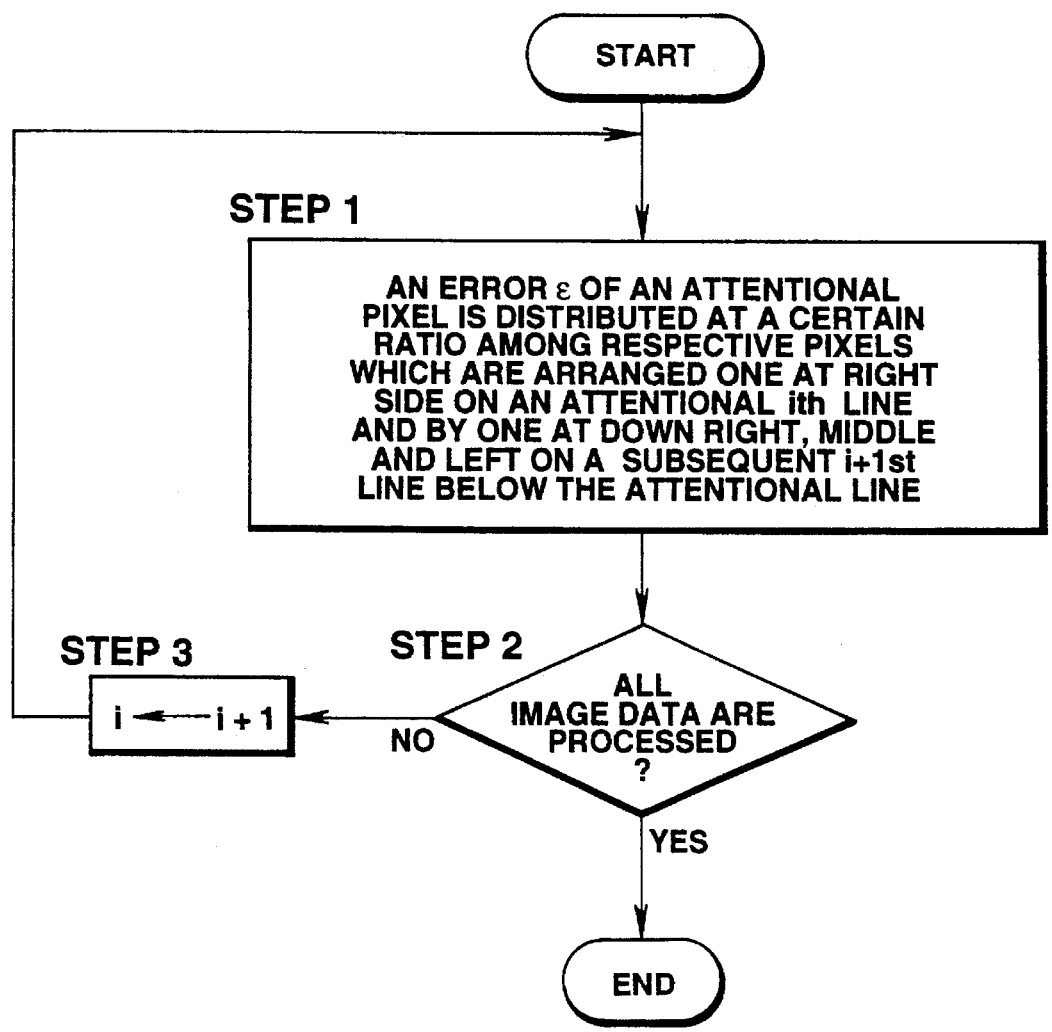
FIG. 3 is a flow chart for explaining a conventional gray-level-image processing method.

FIG. 3 is a flow chart for explaining a conventional method for processing a gray level image. As shown in FIG. 2, the first step detects an error $\epsilon$ in an attentional pixel and distributes it at a specified ratio to adjacent pixels which are arranged to the right of the attentional one on an ith attentional line and at a down right, directly below and down left on an i+1st line below the ith attentional line. The second step determines whether all image data is processed or not and the third step finishes the procedure when all the image data has been processed or if not, assumes an i=i+1 position and returns to step 1 to repeat the procedure.

Figure 4:
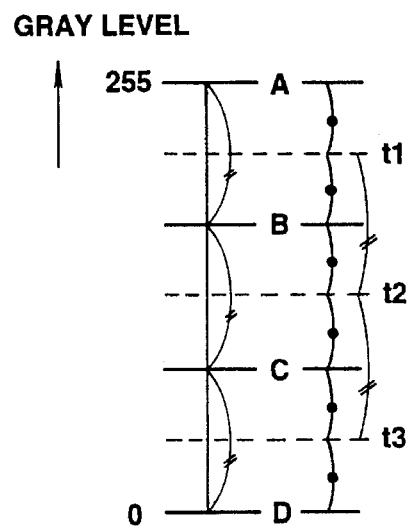
FIG. 4 shows an example of the relationship between quantizing values and thresholds.
Figure 5A:
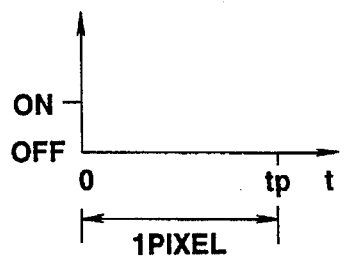
FIGS. 5A, 5B, 5C, 5D show an example of laser gradations.
Figure 5B:
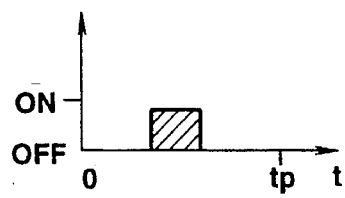
Figure 5C:
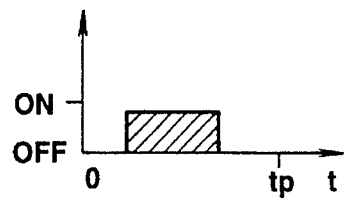
Figure 5D:
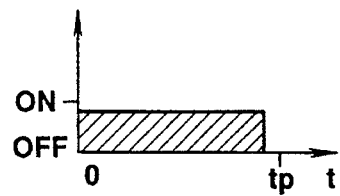

FIG. 4 shows an example of a relationship between quantized values and thresholds. The data on the gray levels of 0 to 255 are divided into 4 quantized values A, B, C and D (representative of the gray levels) and a threshold between the quantized values A and B is defined as t1. Similarly, the threshold between the quantized values B and C and the threshold between C and D are defined as t2 and t3 respectively. Laser (images) gradation is set to represent half-tone image by changing the binary surface area.

FIGS. 5A, 5B, 5C and 5D show an example of laser gradation: each graph indicates laser output along the ordinate and laser ON-OFF time for 1 pixel along the abscissa and represents the laser gradation by a length of laser ON time at a constant laser output.

FIGS. 5A, 5B, 5C and 5D represent laser gradation set by 4 quantized values: 0, 1, 2 and 3 respectively. "1 pixel" denotes the length of time t (0–tp) per pixel. At the laser gradation of 0 (white) of FIG. 5A, the laser is not turned ON and OFF during the length of time of 1 pixel. In contrast, at the laser gradation 3 of FIG. 5D, a laser exists at ON during the time length of 1 pixel. At gradation 1 and 2, the laser is at ON for a respectively specified length of time within 0–tp.

Figure 6:
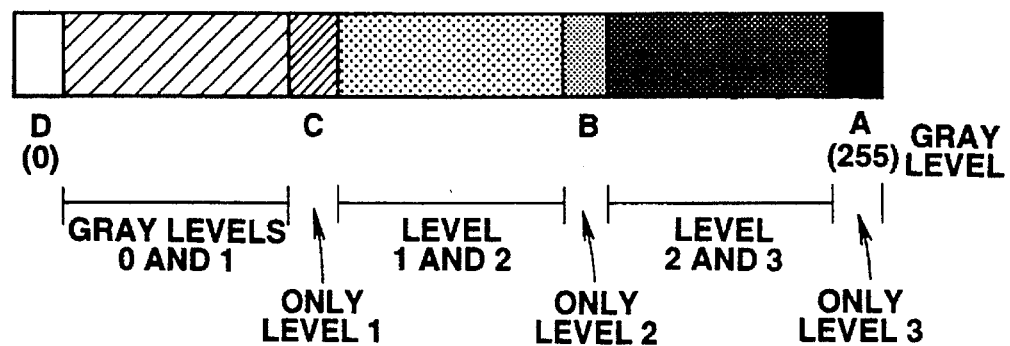
FIG. 6 shows an example of 4 laser gray levels.

FIG. 6 shows an example of laser gradation represented by 4 quantized values. The gray level range corresponds to 0 (white)–255 (black).

Figure 7:
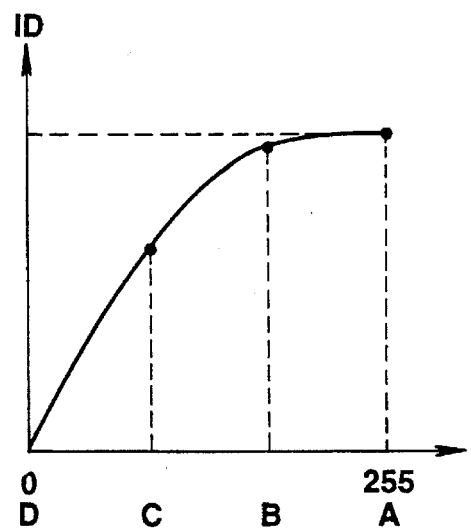
FIG. 7 shows a tonal density curve of the gradation shown in FIG. 5.
Figure 8:
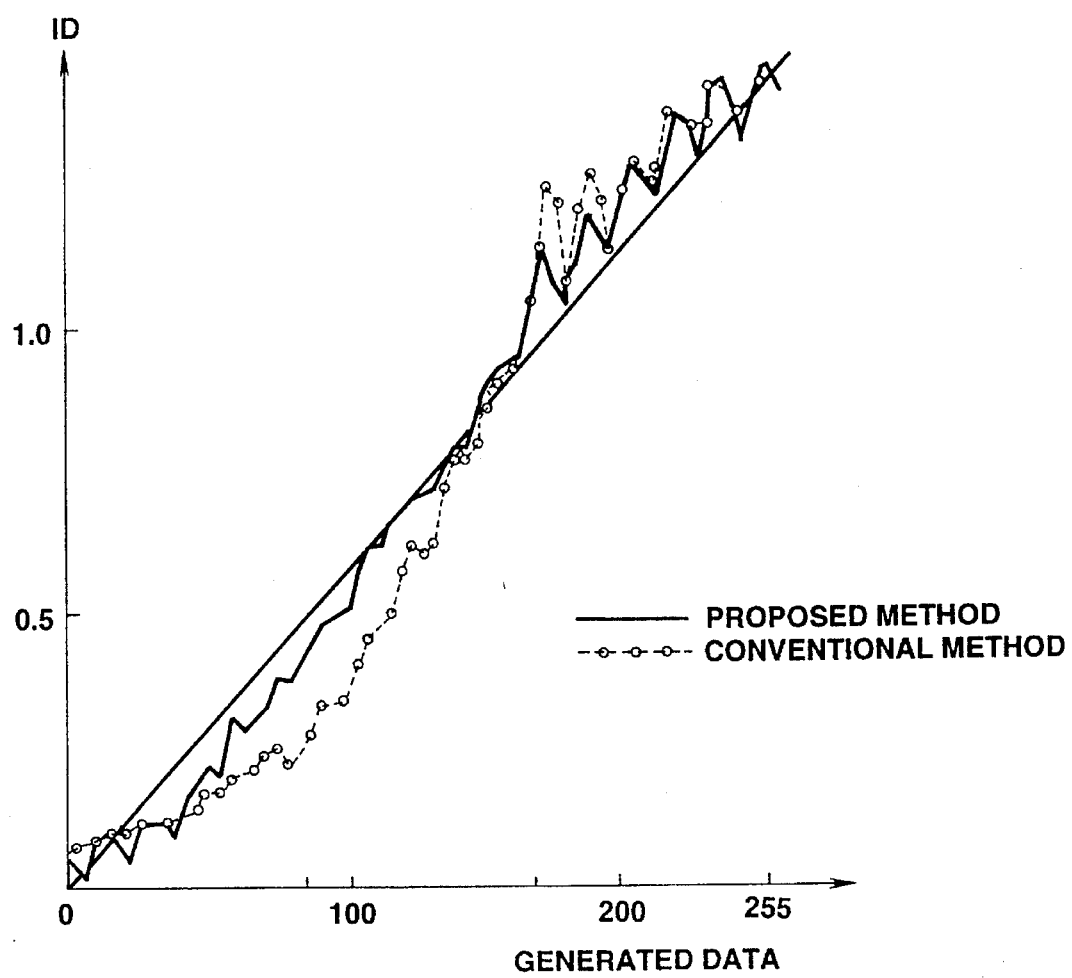
FIG. 8 shows a relationship between a set of data and print density, according to the present invention, in comparison with that obtained by the prior art.

FIG. 7 shows the tonal density curve of the laser gradation shown in FIG. 6. As shown in FIG. 6, the laser gradation and thresholds define 7 gray levels of 0 (white), 0 to 1, 1, 1 to 2, 2, 2 to 3 and 3 (black). However, the tonal density curve of this gradation (FIG. 7) shows that in the high density range B-A a change of tonal density gradually decreases as the gray level rises and finally is saturated.

Figure 9:
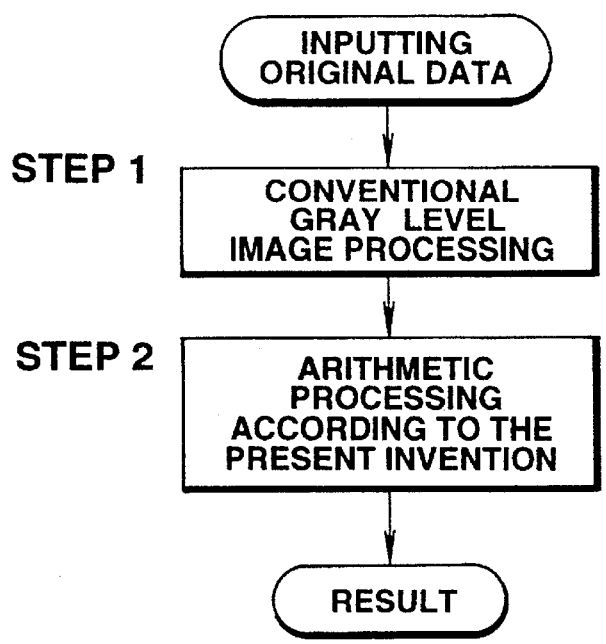
FIG. 9 is a flow chart for explaining the position of a printable data conversion method applied in a gray level image processing device, according to the present invention.

Referring now to the accompanying drawings, preferred embodiments of the present invention will be described in detail as follows:

FIG. 9 is a flow chart for explaining the operation of a printable data conversion system in a gray level image processing device, according to the present invention. In the device, according to the present invention, the data conversion system comprises conventional gray level image processing (step 1) and an operation by two pixels at a constant interval (step 2).

Figure 10:
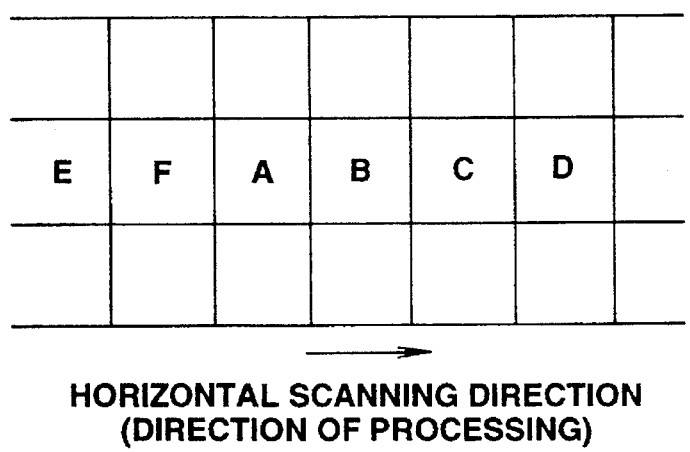
FIG. 10 shows the direction of a data processing method, according to the present invention.

Data quantized by conventional gray level image processing is classified into 4 quantized values W, X, Y and Z for gradations of 0 to 255. These quantized values are processed first by an operation in the processing (horizontal scanning) direction at a constant interval as follows:

In FIG. 10, A and B are presumed to be attentional pixels and they are judged as to whether they correspond to an edge portion within the image or not. All pixels E, F, A, B, C, D shown in FIG. 10 are used as materials for judgment. When these pixels, having a quantized value of 0–3 conform with a predetermined edge portion pattern shown in FIG. 11, the operation will not be conducted between the attentional pixels A and B which are held as they are.

Figures 11, 12:
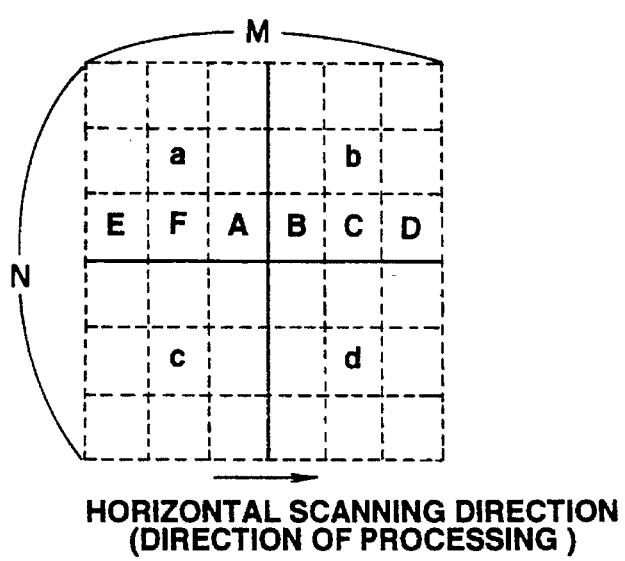
FIG. 11 shows a discrimination pattern for attentional pixels according to the present invention.
FIG. 12 shows an example of a method for discriminating an edge portion within an image, according to the present invention.
Figure 13:
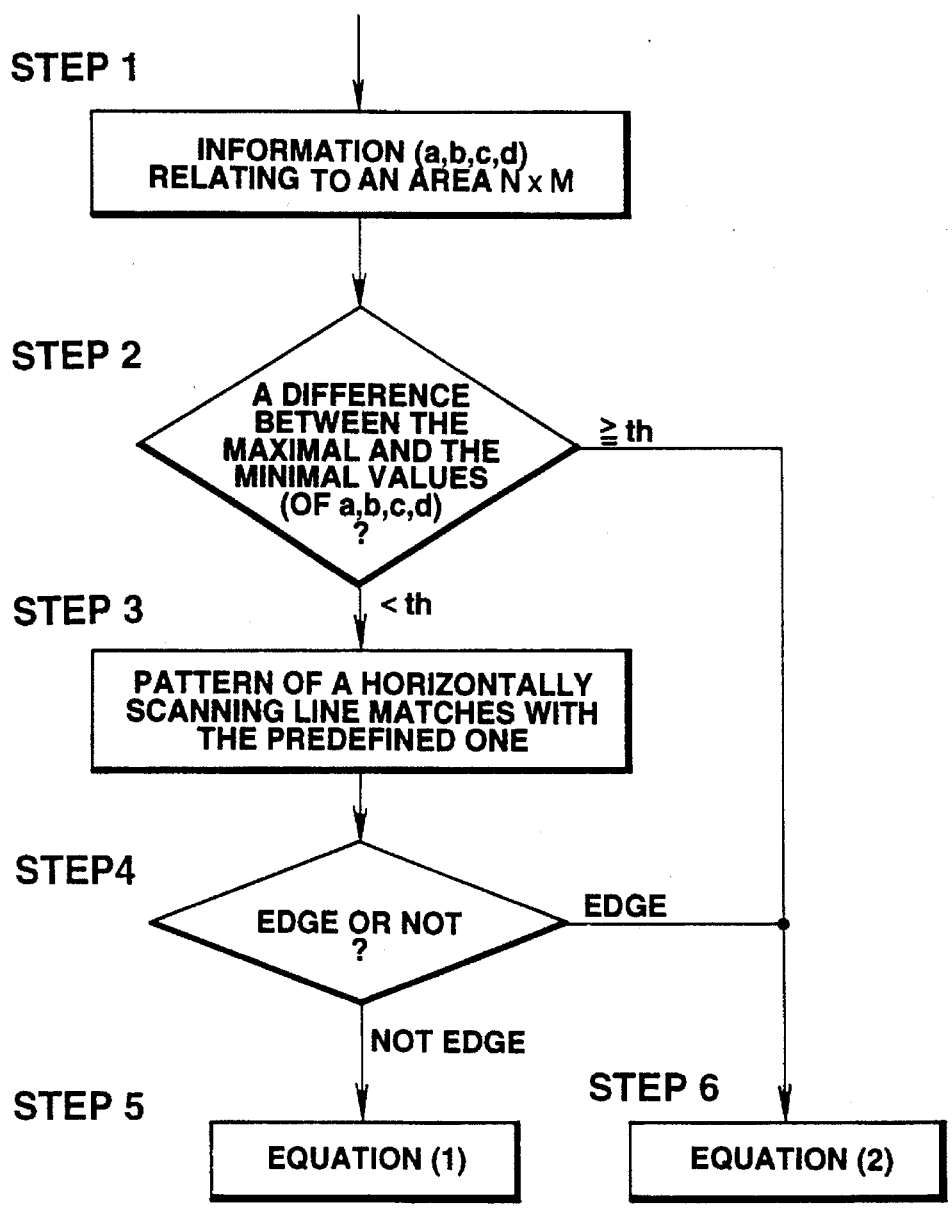
FIG. 13 shows an example of a flow chart of an edge portion processing method, according to the present invention.

As shown in FIG. 12, an information area N×M (N≧1, M≧ a quantity of attentional pixels) for attentional pixels are divided into blocks a, b, c and d. In these blocks, quantized values are summed up (at step 1 of FIG. 13) in each of these 4 blocks. Then the difference between the maximal value and the minimal value is determined (at step 2 of FIG. 13). If the difference in value is smaller than a certain threshold value the following process is conducted:

Pixels A and B (of FIG. 12) are assumed to be attentional elements and are checked whether they correspond to an edge portion of the image (at steps 3 and 4 of FIG. 13). In this case, all pixels E, F, A, B, C and D are used as materials for judgment. When these 6 pixels conform with a predetermined edge portion of the pattern shown in FIG. 11, the attentional pixels' portion is considered as an edge portion and an arithmetic and logic operation according to an equation (2) to be described later, is conducted (at step 6 of FIG. 13). On the contrary, when the attentional pixels do not match with the pattern, the pixels are not concerned with the edge portion and the operation, according to an equation (1) described later, is conducted (at step 5 of FIG. 13). When the difference in value exceeds the threshold value th (at step 2 of FIG. 13), the pixels are judged as being an edge portion of the image and are calculated according to an equation (2) (at step 6 of FIG. 13).

The operation between pixels is carried out as follows: If A and B are attentional pixels, n is a quantity of quantized values and A' and B' are the results of the processing of the respective pixels, the following equation (1) is obtained:

$$\left.\begin{array}{l} A' \leftarrow 0 \\ B' \leftarrow A + B \\ \text{If } B' > n - 1, \\ A' \leftarrow A + B - (n - 1) \\ B' \leftarrow (n - 1) \end{array}\right\} \quad (1)$$

When the pixels are judged to be an edge portion within an image, the following equation (2) is performed to correct the edge portion for enhancement.

$$\left.\begin{array}{ll} \text{If } A, B \neq 0, & A' \leftarrow A + 1 \text{ and } B' \leftarrow B + 1 \\ \text{If } A = 0, B \neq 0, & A' \leftarrow A \text{ and } B' \leftarrow B + 1 \\ \text{If } A \neq 0, B = 0, & A' \leftarrow A + 1 \text{ and } B' \leftarrow B \\ \text{If } A = 0, B = 0, & A' \leftarrow A \text{ and } B' \leftarrow B \end{array}\right\} \quad (2)$$

Then, pixels C and D are subsequently processed. The same process shall be repeated until the last quantized data is processed. The above-mentioned method can attain improved quality of a reproduced image in comparison with the conventional method that only quantizes gray level images. The proposed system not only quantizes input data of a gray level image by the conventional processing method but performs operations on the quantized data for obtaining a constant spacing of the pixels in the horizontal scanning direction (when printing), by means of an operational unit, to effectively reduce the unfavorable effects of the variations of the printer driving pulses and to improve the gray level representation of gray level images to be printed.

In short, the operations for constant inter-pixel spacing is performed in the following manner: If an interval between pixels to be processed is "m" the number of quantized values is "n", the object pixels are $A_1, A_2, A_3 \ldots A_m$ and the results are $A'_1, A'_2, A'_3 \ldots A'_m$, $$l \leftarrow m, A_l' \leftarrow A_1 + A_2 + \ldots + A_m \quad (3)$$

When $$\left.\begin{array}{l} A_1' > n - 1, \\ A_{l-1}' \leftarrow A_1 + A_2 + \ldots + A_l - (n - 1) \\ A_l' \leftarrow n - 1 \\ l \leftarrow l - 1 \end{array}\right\} \quad (4)$$

The equation (4) is repeated until l=2. When l=1, the operation is finished.

The method for discriminating an edge portion within an image, according to an array of quantized data, is used to change over objective pixels to another for which an inter-pixel spacing operation is made.

The inter-pixel spacing operation is performed under the following conditions:

If the pixels relate to an edge portion, their quantized values remain unchanged.

If the pixels relate to a non-edge portion, the following operation is performed:

$$l \leftarrow m, A_l' \leftarrow A_1 + A_2 + \ldots + A_m \quad (3)$$

When $$\left.\begin{array}{l} A_1' > n - 1, \\ A_{l-1}' \leftarrow A_1 + A_2 + \ldots + A_l - (n - 1) \\ A_l' \leftarrow n - 1 \\ l \leftarrow l - 1 \end{array}\right\} \quad (4)$$

where $A_m \ldots A_2$ are attentional pixels and $A_m \ldots A_2$ each exist in a range of 0 to n−1 (the number of quantized values).

The equation (4) is repeated until l=2. When l=1, the operation is finished.

The application of the method for discriminating the edge portions and non-edge portions within an image on the basis of quantized data, makes it possible to perform separately arithmetic and logic operations on pixels for each non-edge portion and a separate operation for the correction and enhancement of each edge portion.

In this instance, the above-mentioned operations are performed in the following manner:

For edge portions, the following operation is performed to correct the data for enhancement as follows:

The level of quantized values is raised by one rank so (n−1 represents the number of quantized values):

$$A_m = A_m + 1 \quad \ldots (5)$$

where $A_m \ldots A_2$ are attentional pixels.

(2) For non-edge portions, the following operation is performed:

$$l \leftarrow m, A_l' \leftarrow A_1 + A_2 + \ldots + A_m \quad (3)$$

When $$\left. \begin{array}{l} A_1' > n-1, \\ A_{l-1}' \leftarrow A_1 + A_2 + \ldots + A_l - (n-1) \\ A_l' \leftarrow n-1 \\ l \leftarrow l-1 \end{array} \right\} \quad (4)$$

The equation (4) is repeated until l=2. When l=1, the operation is finished.

Figure 14:
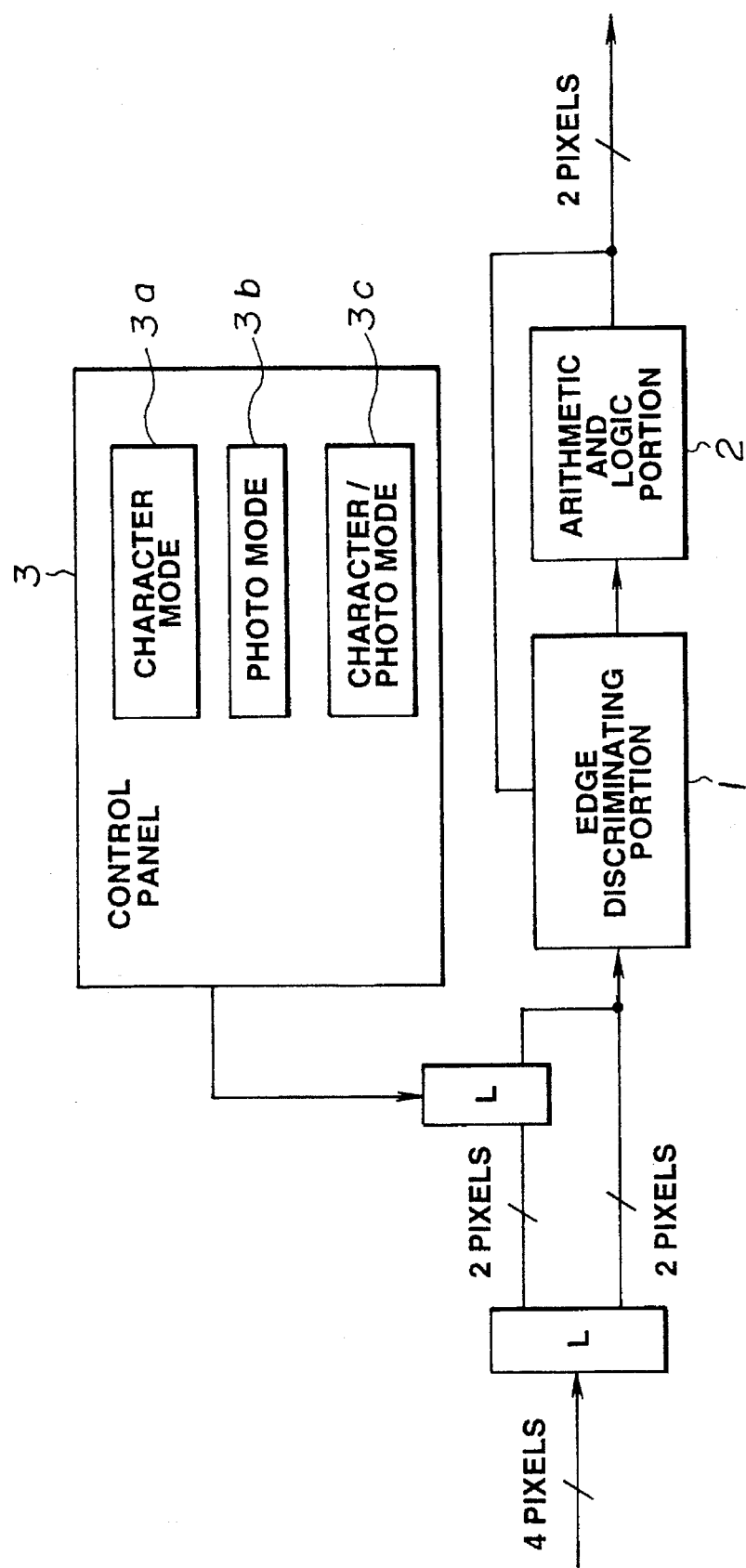
FIG. 14 is a view for explaining a gray level image processing device embodied in the present invention.
Figures 17A, 17B, 17C:
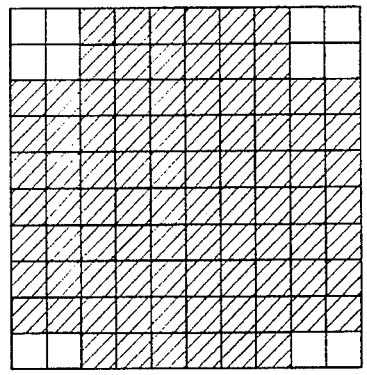
FIGS. 17A, 17B, 17C show data quantized by another embodiment for processing a gray level image according to the present invention in comparison with outputs obtained by conventional methods.

FIG. 14 is a block diagram showing a gray level image processing device embodied in the present invention. In FIG. 14, numeral 1 designates an edge discriminating portion, numeral 2 designates an arithmetic and logic portion, numeral 3 designates a control panel, 3a designates a "Character Mode", 3b designates "Photo Mode" and 3c designates "character/Photo Mode" Input data is quantized by a conventional gray level image processing method (at step 1 of FIG. 9), which is shown in FIGS. 15A, 16A, 17A, 18A and 18B. This quantized data is then processed by two pixels in a horizontal scanning direction. In the shown cases the data has any of 4 quantized values (0, 1, 2, 3).

The edge discriminating portion 1 discriminates whether the data of two pixels relate to an edge portion within the image or not. When the current data is of an edge portion it may be changed over to the subsequent data of two pixels. When the current data does not relate to an edge portion, the arithmetic and logic portion 2 performs an operation on the data.

As shown in the block diagram of FIG. 14, input data is divided into units, each containing two pixels to be processed. For example, when input data contains 4 pixels A, B, C and D, two pixels (A and B) are processed first and two other pixels (C and D) are temporarily stored and later processed.

Figure 18C:
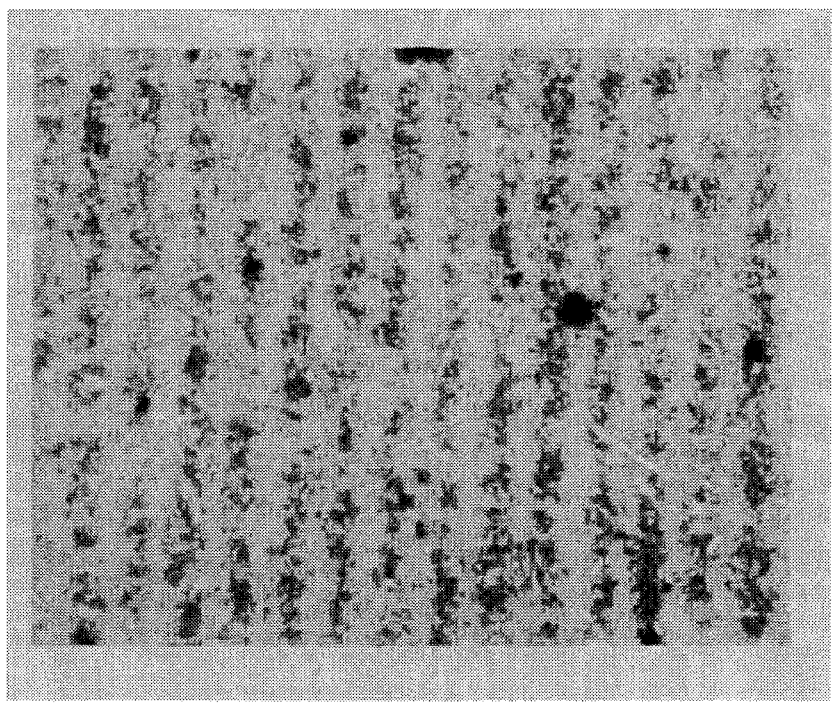
FIGS. 18A, 18B, 18C, 18D show the print condition in reproducing original data at a gray level of 90, according to the present invention, in comparison with that obtained by the prior art.
Figure 18A:
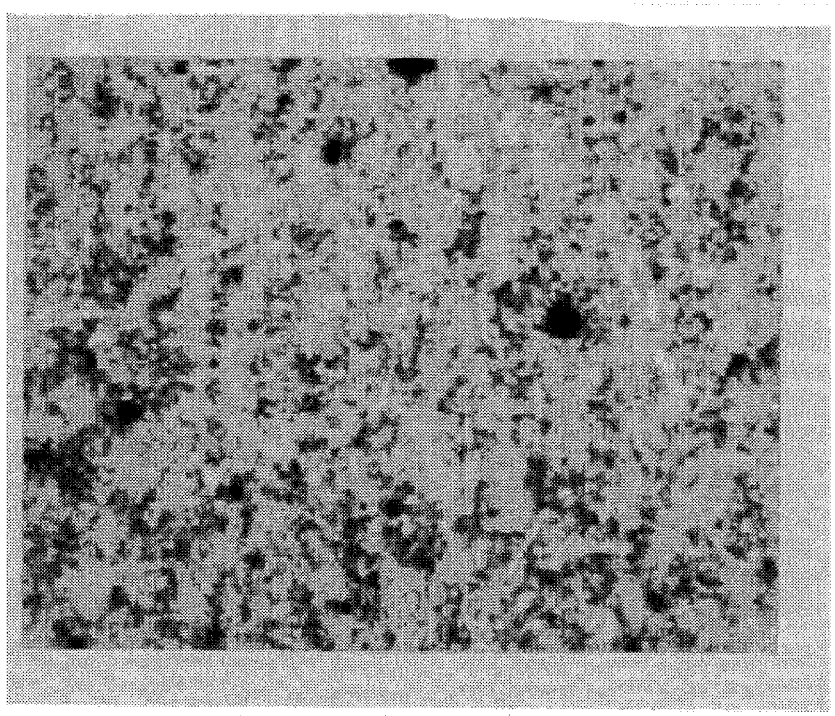
Figure 18B:
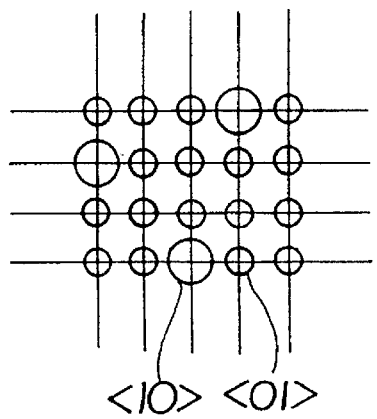
Figure 18D:
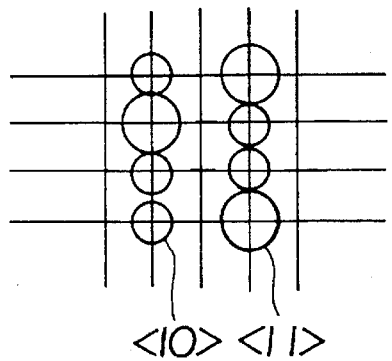

The results of the operations performed on the data are shown in FIGS. 15B, 16B, 16C and 17B, 17C. FIGS. 18C and 18D show a printed image obtained from the original data having a gray level of 90 by the image processing method, according to the present invention.

The application of the above-mentioned method makes the dots representing the pixels to be aligned in a vertical scanning (feed) direction which may minimize the effect of the dots' displacement that may occur due to a deviation in the printer driving pulses. The printed image quality can be improved.

In FIG. 14, there is shown a control panel 3 of an image forming device, e.g., a digital copying machine (not shown) in which the device shown of the present invention is applied. The control panel 3 has mode selector keys arranged thereon for designating the mode of an image to be formed in the machine: a character mode key 3a is used when copying an original copy containing only characters, a photograph mode key 3b is manipulated when copying an original photograph and a character/photograph mode key 3c is used when copying an original copy containing character and photographic elements.

Referring to FIG. 13, the decision to do image processing may be made between step 1 and 2 in accordance with the mode selected by one of the keys 3a, 3b, 3c on the control panel of the digital copying machine (shown in FIG. 14). For instance, when an original copy containing only characters, is designated by the key 3a, the device, according to the present invention, decides to pass the data therethrough without performing the operations of steps 5 and 6 for gray level image processing. When a photographic original is designated by the key 3b, the device decides to perform inter-pixel spacing operations according to the equation (1) of step 5 for gray level image processing. When an original copy, containing characters and photographic elements, is specified by the key 3c, the device determines to execute steps 2 to 4 with discriminating image data for edge portions and non-edge portions and to finally perform an operation according to the equation (1) (step 5) or (2) (step 6).

However, if the image processing portion is allowed to freely perform operations on only quantized data to arrange pixels evenly spaced within a whole image, it may conduct similar calculations on original images containing characters and photographs having edged portions, resulting in that the edges may stick out or be broken off. On the other hand, edge-like parts of a gray level portion may be misjudged as edge portions resulting in the enhancement or elimination of the gray level edges.

Figure 19:
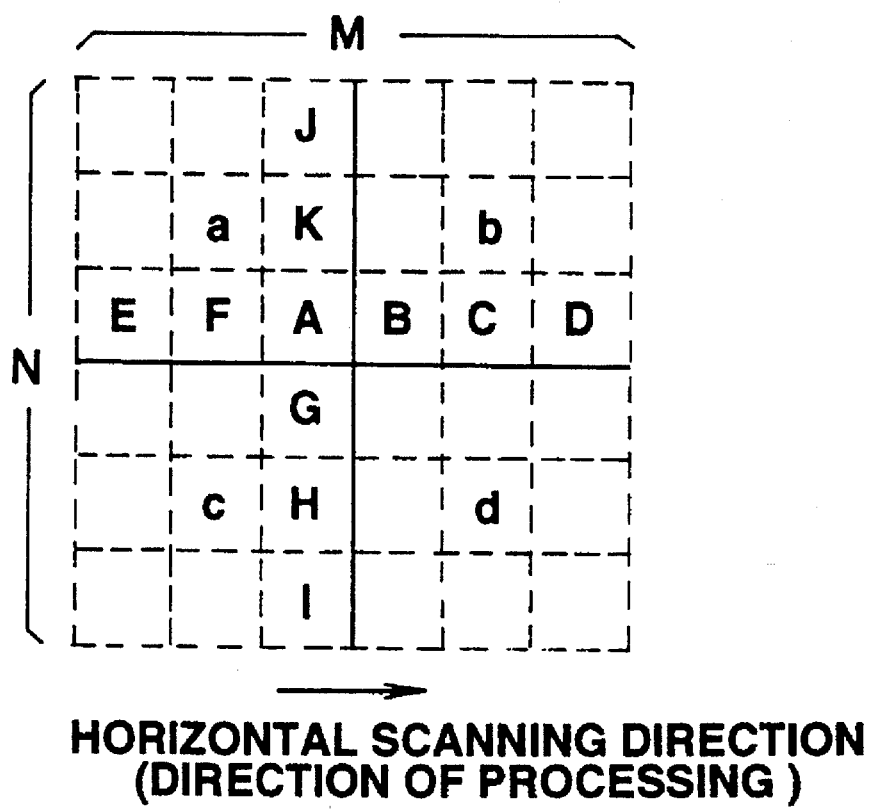
FIG. 19 is a view for explaining another example of a method for processing quantized image data, according to the present invention.

To avoid this, as shown in FIG. 19, edge discrimination is conducted in a vertical scanning (feed) direction in a similar way as the edge discrimination in a horizontal scanning (processing) direction with attentional pixels A and B shown in FIG. 12. In this instance, a vertical array of pixels J, K, G, H (including an attentional pixel A) serve as elements for judgment.

As shown in FIG. 19, an area that is larger than two attentional pixels A and B to be processed and laid in a horizontal scanning direction is assumed and divided into a required number of blocks (6×6). Quantized values are summed up in each of the blocks and then a difference between the maximal and minimal values is determined. The pixels are judged to be an edge portion in the horizontal scanning direction if the difference in value is larger than a specified value. They are considered as non-edge portions if the difference in value is smaller than the specified value. Similarly, edge discrimination in a vertical scanning direction is also conducted for one of two attentional pixels.

FIG. 20 shows conditions on an edge pattern in the vertical scanning direction. Each value indicates a tonal density (gray level) of pixels. 6 pixels J, K, A, G, H and I disposed in the vertical scanning (i.e., feeding) direction and are checked whether they match with a predefined pattern representing an edge portion or not. In this case, pixels A and G are judged to be an edge portion if the 6 pixels conform to the edge pattern or a non-edge portion if the 6 pixels do not conform with the pattern. When the judgement result is "Edge", the attentional pixels A and B are passed through as having the quantized values without any change.

When the judgement result is "Non-edge", the two attentional pixels A, B, together with pixels E, F, C, D for judgment elements, arranged in a horizontal scanning direction as shown in FIG. 11, are checked again whether they match a predefined pattern representing an edge portion or not.

When this final judgment result indicates "Non-edge", an operation for the attentional pixels A and B is performed according to the equation (1). On the contrary, if the pixels are finally judged to be an edge, they are passed through as having quantized values without any change.

As described above, the present method can accurately distinguish between an edge portion and a non-edge portion on the basis of information obtained in equally divided areas and in both horizontal and vertical scanning directions therein, thereby printed images derived from thus processed data may have an improved quality in comparison with that obtained by the conventional method that, as previously described, freely performs operations on input data for allocating pixels within a whole image and outputs them.

Figure 21:
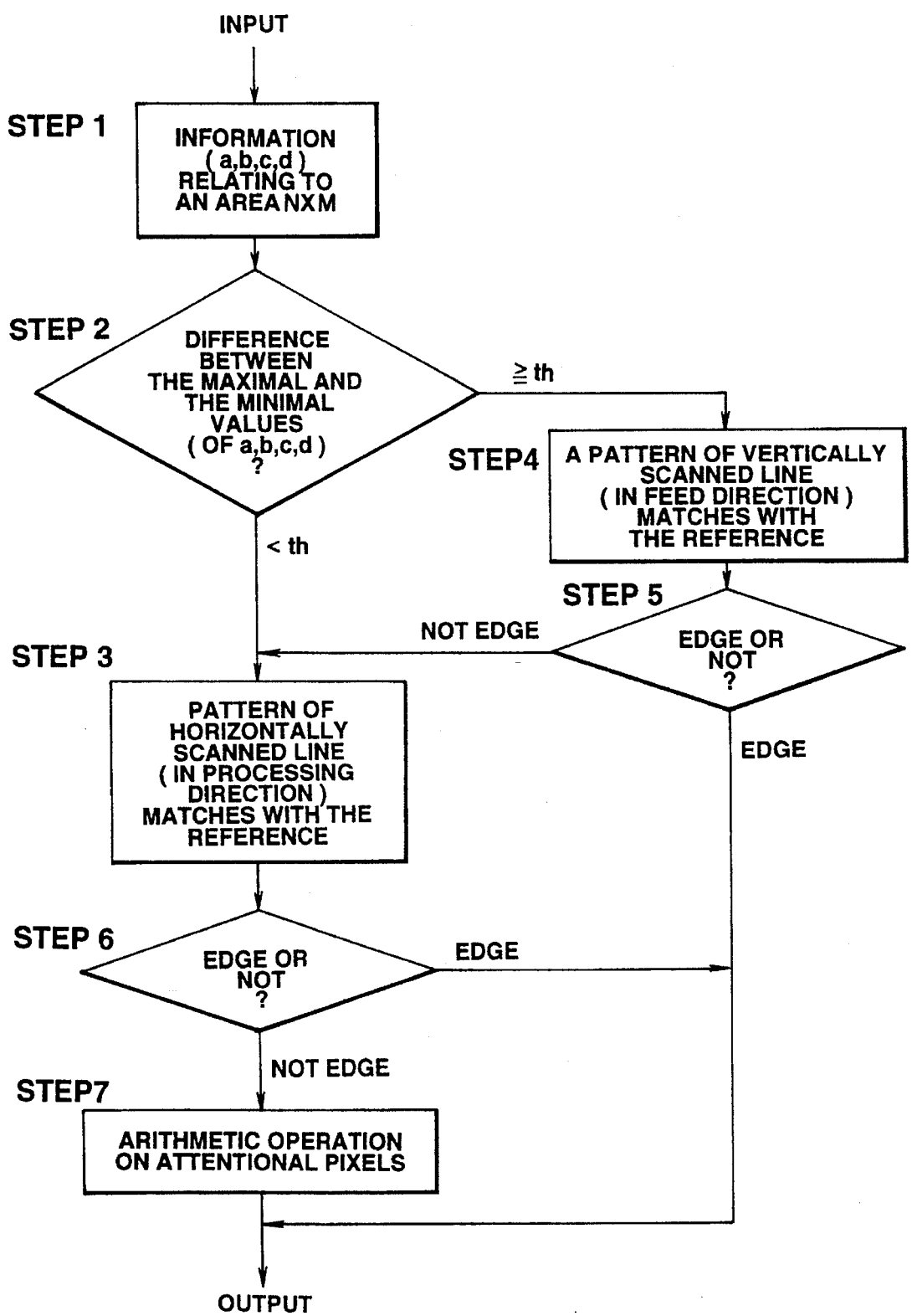
FIG. 21 is a flow chart of a gray level image processing device embodied the present invention.

FIG. 21 shows a combination of a flow chart shown in FIG. 13 for discriminating data relating to an edge portion in a horizontal scanning direction and a flow chart for discriminating data relating to an edge portion in a vertical scanning direction. As shown in FIG. 21, an information area n x m of input quantized data, containing attentional pixels, is selected and divided into even blocks a, b, c and d. Among quantized values of these 4 blocks (a, b, c and d), the maximum value and the minimum value are determined. These quantized values represent respectively the maximum and minimum densities of the pixels (at step 1).

A difference between the maximum value and the minimum value is determined and checked whether it is larger or smaller than a predetermined threshold value (at step 2).

If the difference in value is smaller than the constant threshold value "th", a pattern of the data in a horizontal scanning direction is checked as to whether it matches a predefined edge data pattern or not (at step 3).

If the difference value is equal to or larger than the constant threshold value "th", a pattern of the data in a vertical scanning direction is checked whether it matches a predefined edge data pattern or not (at step 4).

If the vertical pixels' pattern is judged to be of a non-edge portion, the data shall be transferred to step 3. If the vertical pixel pattern is judged to be of an edge pattern, the pixels' data is allowed to pass through without being processed and be output (from step 5).

At step 3, the horizontal pixels' pattern of the data is checked as to whether it conforms to the predefined horizontal edge data pattern. The data judged to be an edge portion is output without any change (at step 6). When both horizontal and vertical pixels' patterns are judged to be of non-edge portions, arithmetic and logic operations are made on attenional pixels, according to the equation (1) (at step 7).

While an output image (FIG. 22A), obtained by a prior art method does not faithfully represent the data quantized by gray level image processing (FIG. 22B) with respect to boundaries between edge portions and non-edge portions within the image (which are enclosed by thick lines in FIGS. 22A and 22B), an output image obtained by the method, according to the present invention (FIG. 22C), faithfully reproduces the edge portion value within the quantized data image of FIG. 22B.

Figure 23:
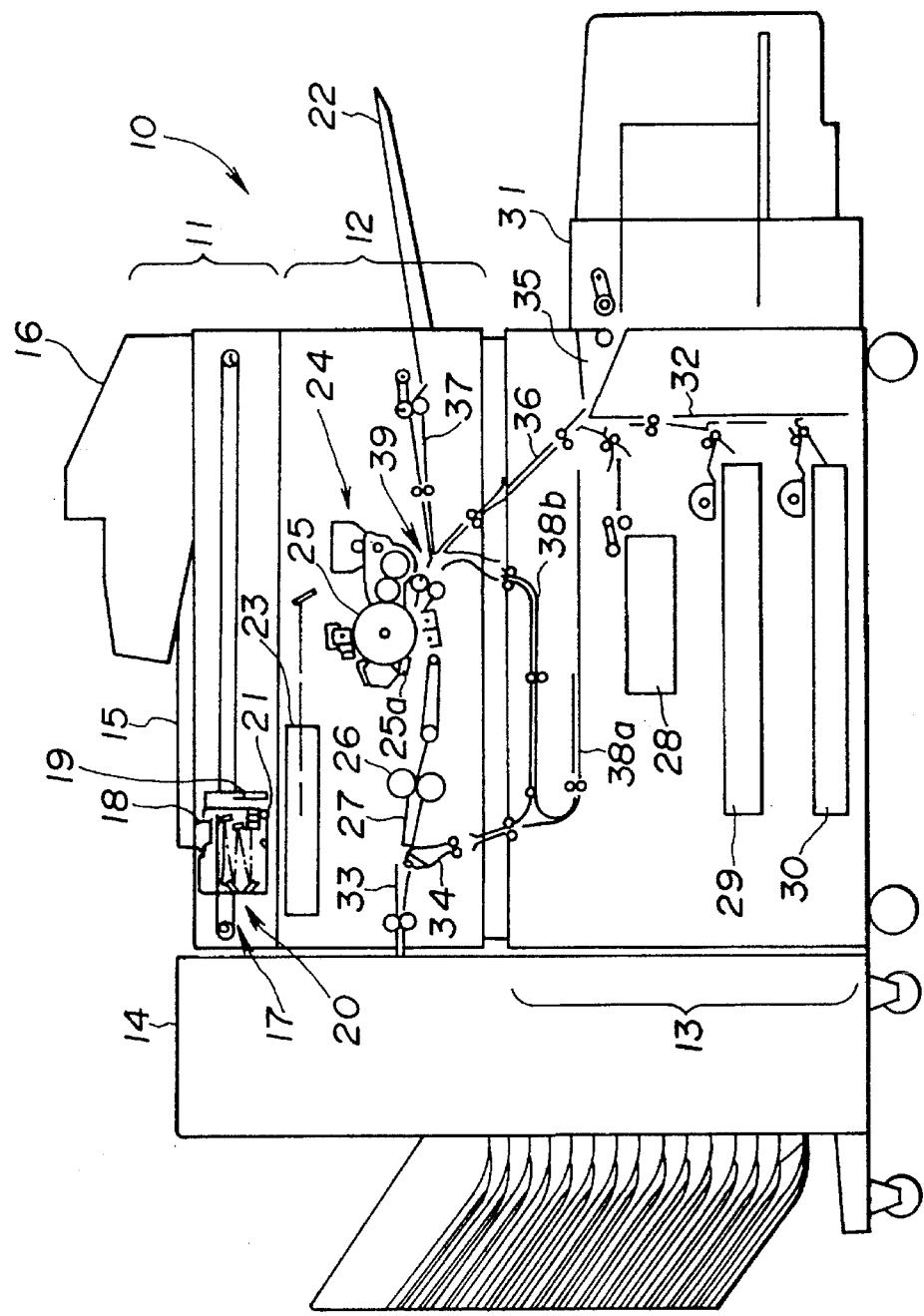
FIG. 23 is a sectional view showing a whole construction of a digital copying machine equipped with the function of gray level image processing, according to the present invention.

FIG. 23 is a sectional view showing a whole construction of a digital copying machine equipped with a gray level image processing function according to the present invention. The digital copying machine 10 comprises a scanner 11, a laser printer 12, a multistage sheet feeder 13, a sorter 14, a glass plate 15 for placing thereon an original copy, an automatic reversible document feeder (RDF) 16 for an original copy printed on both sides, a scanning unit 17, a lamp and a reflector assembly 18, a photoelectric element (e.g., a charge-coupled device) 19, a reflecting mirror 20, a lens 21, a manual document feeder tray 22, a laser writing unit 23, an electrophotographic processing portion 24, a light-sensitive drum 25, an optical reader 25a, a fixing unit 26, a transporting path 27, a first cassette 28, a second cassette 29, a third cassette 30, a fifth cassette 31, a common paper-conveying path 32 and paper-conveying paths 33–37, and 38a, 38b.

The digital copying machine 10 is equipped with a scanner 11, a laser printer 12, a multistage sheet feeder 13 and a sorter 14. The scanner comprises of a transparent glass plate 15 for placing thereon an original copy to be copied, the automatic reversible document feeder 16 for an original copy printed on both sides and a scanning unit 17. The multistage sheet feeder 13 includes the first cassette 28, the second cassette 29, the third cassette 30 and the fifth cassette 31 additionally attachable by a user's option. Printing sheets piled in each cassette can be fed one by one from the top and be transferred to the laser printer 12.

The automatic reversible document feeder 16 can contain a plurality of original copies to be printed and which automatically feeds originals one after another into the scanner unit 17 which reads data from one side or both sides of each original draft according to the operator's selection. The scanner unit 17 includes a lamp and reflector assembly 18 for illuminating the original, a plurality of reflecting mirrors 20 for directing a reflected image from the original to the photoelectric conversion element, e.g., charge coupled device (CCD) 19 and a lens 21 for forming a reflected image on the CCD 19.

In the scanner 11, scanner unit 17 can move along the bottom surface of the transparent glass plate 15 reading an original copy placed on the top surface of the glass plate. In the case of applying the reversible document feeder 16, the scanner unit 17 is preset at a specified position underneath the feeder 16 and reads an original copy being transported by the feeder 16. The image data obtained by reading the original by the scanner unit 17 is transferred to the image processing portion in which they are processed. The processed image data is temporarily stored in a memory of the image processing portion and, when the operator's request is given, they are read out from the memory and transferred to the laser printer 12 by which the data is printed out to reproduce the original image on a printing sheet.

The laser printer 12 is provided with a manual document feeder tray 22, a laser writing unit 23 and a electrophotographic(xerographic) processing portion 24. The laser writing unit 23 has a semiconductor laser for emitting laser light corresponding to the image data read out of the memory, a polygonal mirror for deflecting laser light at equiangular velocity and an f-θ lens for compensating the deflected laser light on the photosensitive drum 25 of the electrophotographic processing portion 24. The electrophotographic processing portion 24 has a light-sensitive drum 25 which is surrounded by a charging device, a developing device, a transferring device, a removing device, a cleaning device, a discharging device and a fixing unit 28. An optical reader 25a measures a reflection factor as a function of tonal density of the toner image on a light-sensitive drum 25, and is provided upstream to the cleaning device. A paper conveying path 27, provided at the downstream side of the fixing unit 26, has a branch 33 leading to the sorter 14 and a branch 34 leading to the multistage sheet feeder 13.

In the multistage paper feeder 13, the paper conveying path 34 branches into two paper-conveying paths 38a and 38b. The path 38a is used for reversing the side of the printing paper when the two sides of the original copy are printed on both sides of the paper. The path 38b is used for conveying the paper being printed from the path 38a to an image-forming position of the light- sensitive drum 25 in two-sided copying modes and it is also used for conveying the paper being printed without reversing its side to the image-forming position of the drum 25 in the one-sided composite copying mode for multi-color or multi-image copying on one side of the paper.

The multistage sheet feeder 13 contains a common paper-conveying path 32 which is designed to transport paper sheets being printed from the first cassette the second cassette 29 and the third cassette 30 toward the electrophotographic process portion 24. The common paper-conveying path 32 joins with a paper-conveying path 35 from the fifth cassette 31 at the midway point and communicates with a paper-conveying path 36 which in turn joins with the paper-conveying path 38b and the paper conveying path 37 from the manual paper-feeding tray 22 at a joining point 39 and extends to the image-forming position between the toner-transferring device and the light-sensitive drum 25 of the electrophotographic process portion 24. The joining point 39 of three paths is located near the image-forming position.

According to the image data read out of the memory, the laser writing unit 23 produces with laser light an electrostatic latent image on the light-sensitive drum 25 which is then developed with toner and electrostatically transferred and fixed by heat onto paper fed from the multistage sheet feeder 13. Thus printed paper is transported through the paths 27 and 33 from the fixing device to the sorter 14 or is transported through the paths 27 and 34 and the path 38a for further printing on its reverse side.

Figure 24:
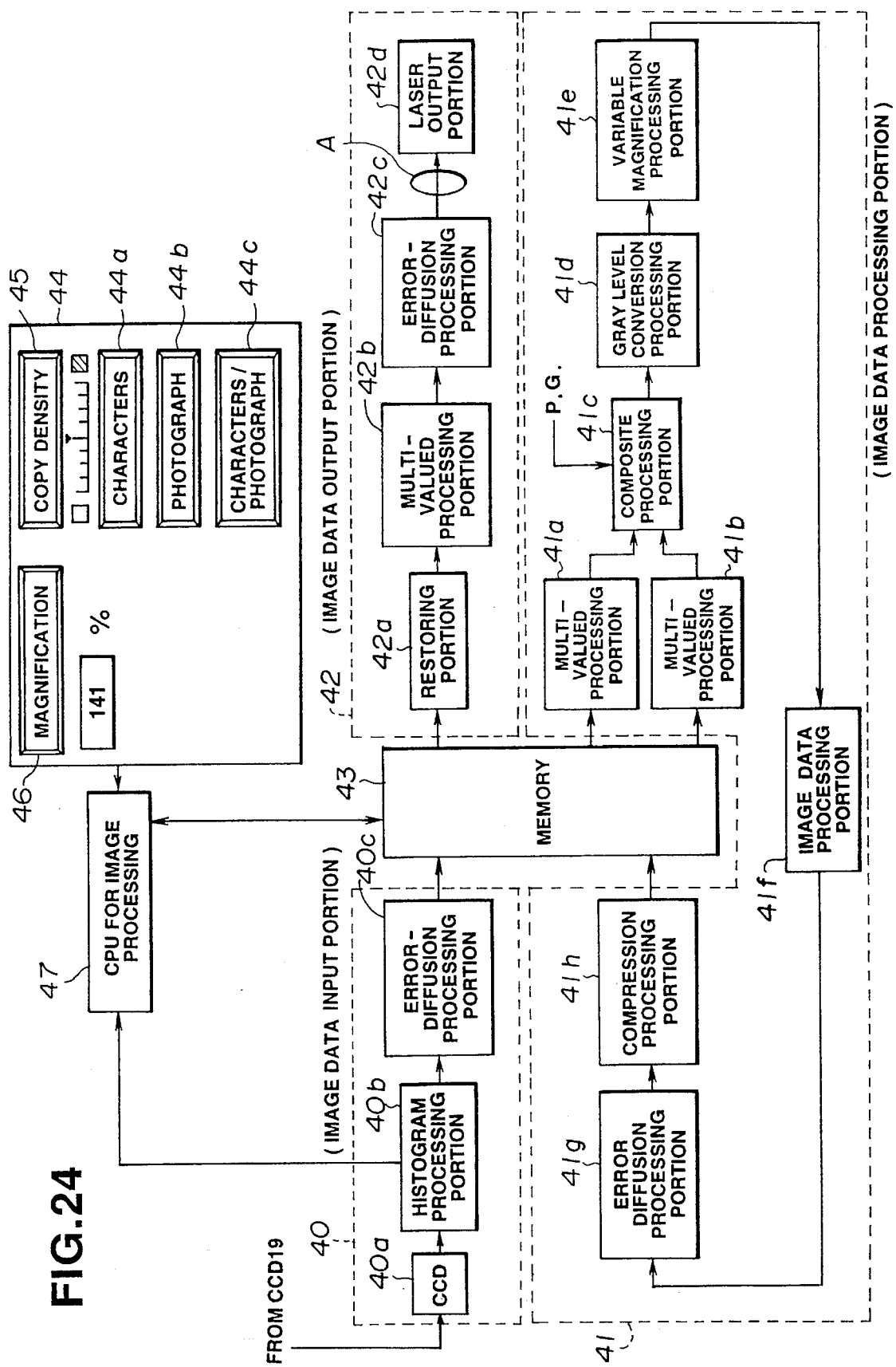
FIG. 24 is the block diagram of an image processing portion and circuits of a control system included in the copying machine shown in FIG. 23.

FIG. 24 is a block diagram of an image processing portion and its control circuits included in the digital copying machine with facsimile functions shown in FIG. 23. In FIG. 24, a conversion method according to the data as present invention is applied to the shown at A, and there is shown an image data inputting portion 40 which includes a CCD 40a, a histogram processing portion 40b and an error-diffusion processing portion 40c; an image data processing portion 41 which includes multi-valued processing portion 41a, 41b, a composite processing portion 41c, a gray level conversion processing portion 41d, a variable magnification processing portion 41e, an image processing portion 41f, an error-diffusion processing portion 41g and a compression processing portion 41h; an image data output portion 42 which includes a restoring portion 42a, a multi-valued processing portion 42b, an error-diffusion processing portion 42c, a laser output portion 42d; a memory 48, a control panel 44 with control keys "Characters" 44a, "Photograph" 44b, "Characters/Photograph" 44c, "Copy Density" 45, and "Magnification" 46; and a central processing Unit (CPU) 47 for image processing.

The image data processing incorporated in the digital copying machine 10 is equipped with an image data input portion 40, an image data processing portion 41, an image data output portion 42, a memory 43, e.g., random access memory and a central processing unit (CPU) 47.

The image data input portion 40 includes a CCD 40a, a histogram processing portion 40b and an error-diffusion processing portion 40c. The image data input portion 40 is designed to binarize image data read in through CCD 19 of FIG. 23, process the data by an error-diffusing method making a histogram by digital values of binarized data and then temporarily storing the resulting data in the memory 43. In the CCD 40a, analog electrical signals corresponding to gray levels of the image data are converted into digital signals which are then subjected to the correction of the modulation transfer function (MTF) and black-and-white corrections or gamma corrections to form digital output signals having gray levels of 0 to 256 (8 bites). The obtained signals are transferred to the histogram processing portion 40b.

The histogram processing portion 40b receives the digital signals and derives therefrom information on tonal densities (gray level histogram) by building up distributions of 256 gray levels. The obtained histogram data is sent to the CPU 47 (as is needed) or transferred in the form of pixels' data to the error-diffusion processing portion 40c in which a digital signal of 8-bits per pixel is converted into a signal of 1-bit (binary digit) by an error diffusing method known as pseudo pray level processing, i.e., by forcing a binarization error of one pixel to be reflected on the evaluation of binarization of the adjacent pixels. This operation for redistributing pixels is necessarily performed for faithfully reproducing local tonal densities on the original document.

The image data processing portion 41 includes the multi-valued processing portion 41a and 41b, the composite processing portion 41c, the gray level conversion processing portion 41d, the variable magnification processing portion 41e, the image processing portion 41f, the error diffusion processing portion 41g and the compression processing portion 41h. The image data processing portion 41 is provided for finally converting input image data into desired image data according to the processing mode instructions input by the operator through the control panel 44. The finally processed image data is stored in the memory 43. All processing portions included in this portion 41 work as need be.

In the multi-valued processing portions 41a and 41b, the data binarized by the error-diffusion processing portion 40c are converted again into the data of 256 gray levels. The composite processing portion 41c performs logical operations by pixel, selectively conducting logical sums(OR), logical products(AND) or exclusive-OR operations on image data stored in the memory 43 or bit data from a pattern generator.

The gray level conversion processing portion 41d determines the desired ratio of the output gray level relative to an input gray level on the basis of a gray level conversion table, according to an instruction input by means of the key "Copy density" 45 on the control panel 44.

The variable magnification processing portion 41e receives a magnification instruction input by means of the key "Magnification" 46 on the control panel 44, determines pixel data (gray level value) of each object picture element after magnification by an interpolation processing with the use of known input data, and changes the magnification of the image first in the vertical scanning (feeding) direction and then in the horizontal vertical scanning (processing) direction.

The image processing portion 41f can perform a variety of image processing operations on the input data of pixels and can collect information on data array, e.g., feature extraction and so on. The error-diffusion processing portion 41g performs a processing operation similar to that of the error-diffusion processing portion 40c of the image data inputting portion 40. The compression processing portion 41h compresses binary data by run length coding.

The image data output portion 42 includes the restoring portion 42a, the multi-valued processing portion 42b, the error-diffusion processing portion 42c and the laser output portion 42d.

A printable data conversion system of the gray level image processing device, according to the present invention, is applied between the error-diffusion processing portion 42c and the laser output portion 42d.

The image data output portion 42 is designed for restoring the image data stored in a compressed state in the memory 43, converting them into the image data of 256 gray levels, diffusing errors of 4-valued data to obtain more smooth gray level representation in comparison with 2-valued data smoothing and then transferring the processed data to the laser output portion 42d. The restoring portion 42a serves to restore the image data compressed by the compression processing portion 41h.

The multi-valued processing portion 42b performs operations similar to those the multi-valued processing portions 41a, 41b of the image data processing portion 41. The error-diffusion processing portion 42c performs operations similar to that of the error-diffusion processing portion 40c of the image data inputting portion. The laser output portion 42d turns ON and OFF laser lights according to control signals from the control CPU to represent the digital image data.

Although the image data to be processed by the image data input portion 40 and the image data output portion 42, usually is stored in binary form in the memory 43, which may have a saved capacity, it is also possible to process the image data in 4-valued condition to avoid possible deterioration of the data.

Figure 25:
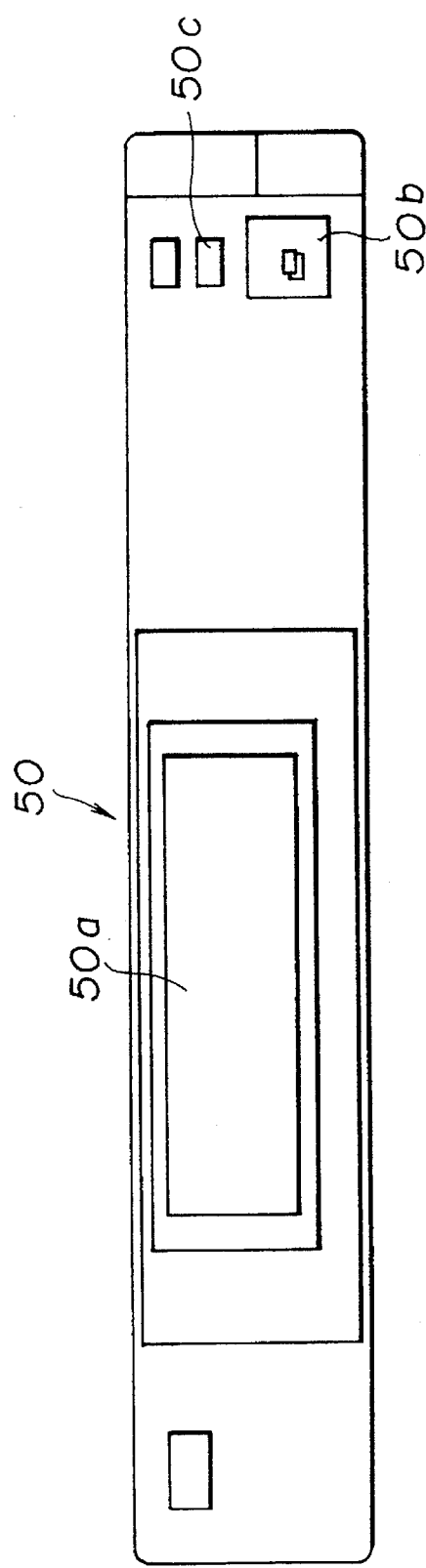
FIG. 25 is a plan view showing an example of a control panel of the digital copying machine of FIG. 23.

FIG. 25 is a plan view showing an example of a control panel of the digital copying machine 10 shown in FIG. 23. A display portion 50a and a mode selector key 50c are arranged respectively at the middle and at the right end of the control panel 50.

The display portion 50a may be composed of a dot-matrix LCD and a transparent touch panel.

Figure 26:
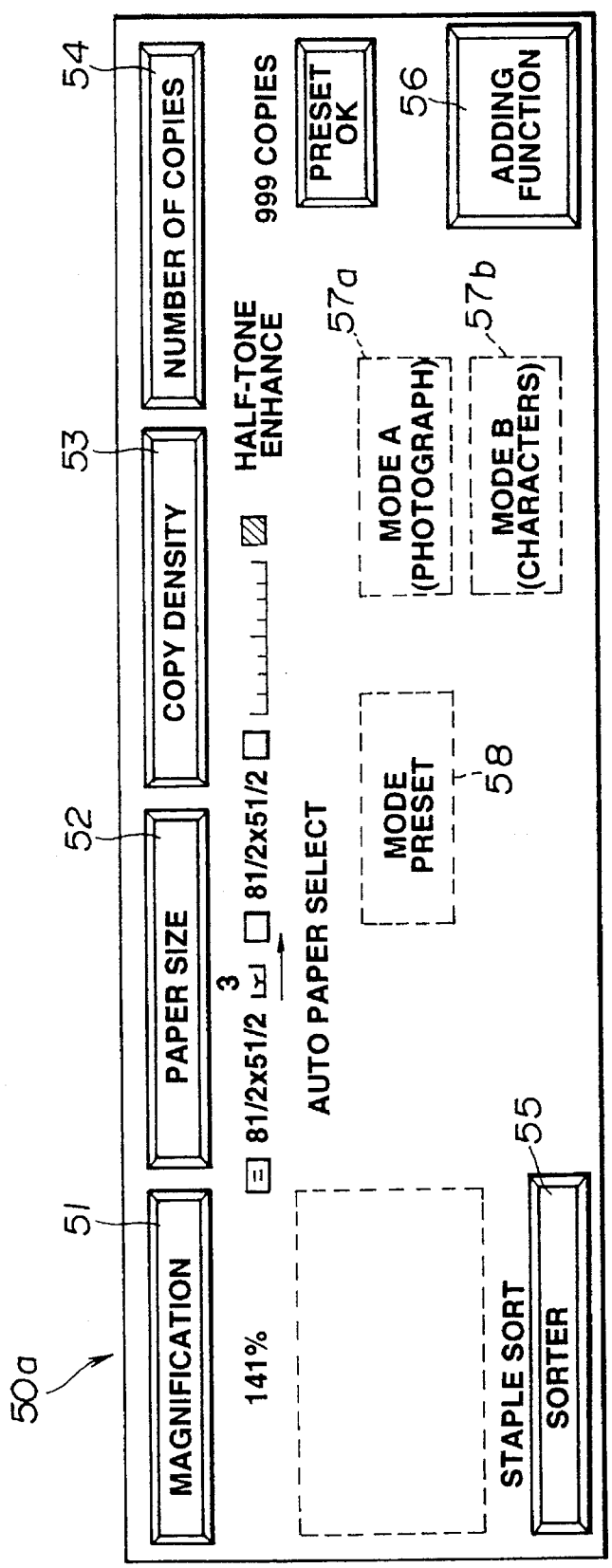
FIG. 26 shows indicators and controls on the portion of the control panel of FIG. 25.

FIG. 26 illustrates an example of the display portion 50a of the control panel of FIG. 25. In FIG. 26, there are touch panel type setters "Magnification" 51, "Paper Size" 52, "Copy Density" 53, "Number of Copies" 54, "Sorter" 55 and "Adding Function" 56. When the setter "Adding Function" 56 is touched, an indicator "Mode Preset Allowed" 58 lights up and an indicator "Mode A (Photo)" 57a or "Mode B (Character)" 57b appears to represent the selected mode.

The mode setting of the device, according to the present invention, is conducted on the display portion 50a of the control panel of FIG. 26 in the above-mentioned manner.

The following description is concerned with another construction and corresponding functions of an image processing portion and related control circuits contained in the digital copying machine.

Figure 27:
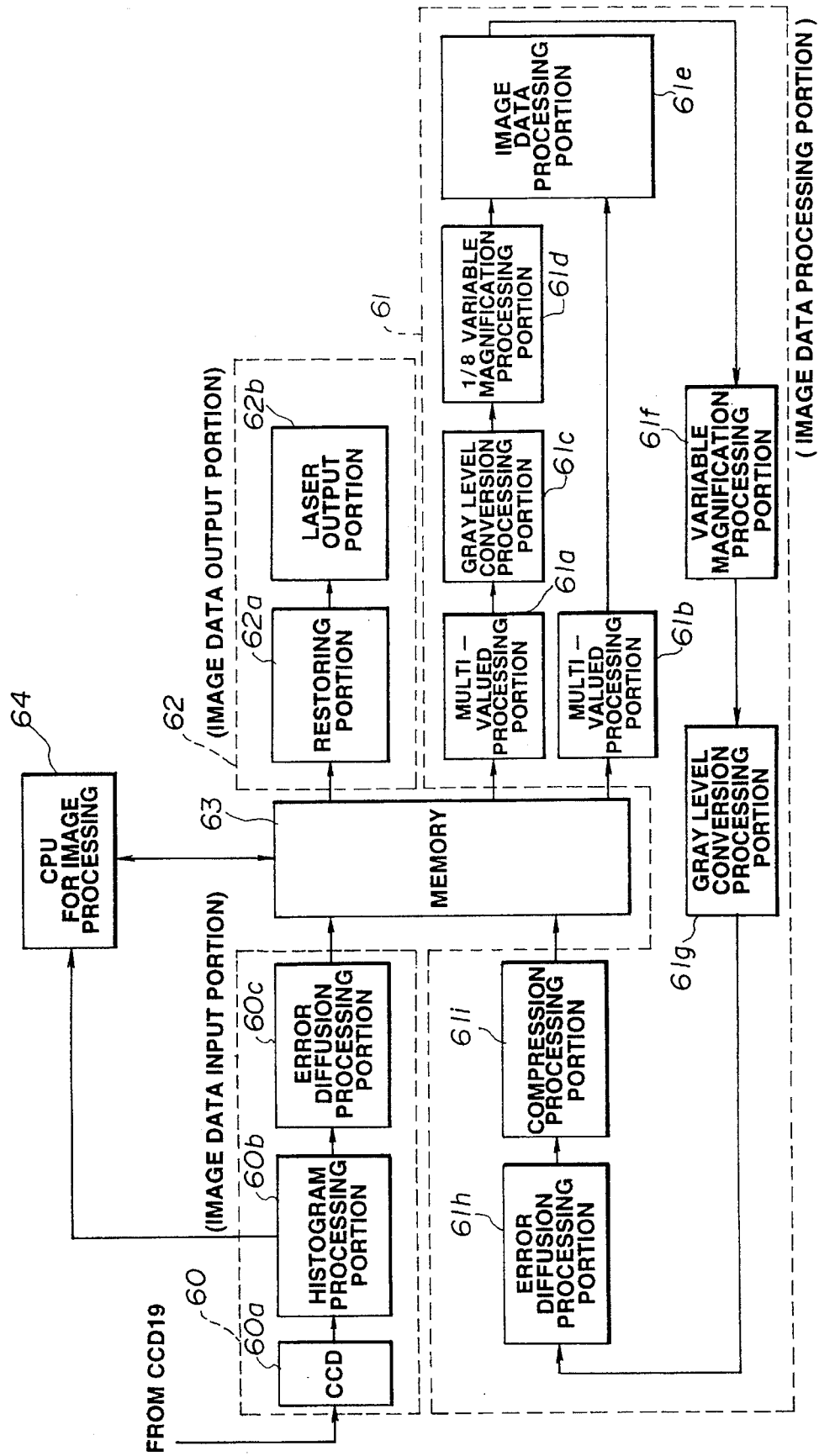
FIG. 27 is a block diagram of an image processing portion and control circuits included in the digital copying machine 10 of FIG. 23.

FIG. 27 is the another block diagram of the image processing portion and its control circuits included in the digital copying machine shown in FIG. 23.

The image data processing unit, incorporated in the digital copying machine 10, is equipped with an image data input portion 60, an image data processing portion 61, an image data output portion 62, a memory 63, e.g., random access memory and CPU (Control Processing Unit) 64.

The image data input portion 60 includes a CCD 60a, a histogram processing portion 60b and an error-diffusion portion 60c. The image data input portion 60 is designed to binarize image data read in through CCD 19 of FIG. 23, process the data by an error diffusing method, make a histogram by digital values of the binarized data, and then temporarily store the resulting data in the memory 63.

In the CCD 60a, analog electrical signals corresponding to the gray levels of the image data, are converted into digital signals which are then subject to a correction of the modulation transfer function (MTF) and black and white correction or gamma correction to form digital output signals having the tonal densities of 0 to 256 (8 bites). The obtained signals are transferred to the histogram processing portion 60b.

The histogram processing portion 60b receives the digital signals and derives therefrom information about the tonal densities (gray level histogram) by building up distributions of 256 gray levels. The obtained histogram data are sent to the CPU 64 as need be or they are transferred in the form of pixels' data to the error-diffusion processing portion 60c in which a digital signal of 8-bits per pixel is converted into a signal of 2-bits (8 digits) by the error diffusing method known as one of pseudo gray level processing, i.e., by forcing a binarization error of one pixel to be reflected on the evaluation of the binarization of adjacent pixels. This operation for the redistribution of pixels is necessarily performed to faithfully reproduce local tonal densities on the original document.

The image data processing portion 61 includes multi-valued processing portions 61a and 61b, a gray level conversion portion 61c, a ⅛ variable magnification processing portion 61d, an image processing portion 61e, a variable magnification portion 61f, a gray level conversion portion 61g, an error-diffusion and processing portion 61h and a compression processing portion 61i.

The image processing portion 61 is provided for finally converting the input image data into the desired image data according to the processing mode instructions input by the operator. The final processed image data is stored in the memory 63. All processing portions included in this portion 61 work as needed. They may not always function as desired.

In the multi-valued processing portions 61a and 61b, the data converted into 4 digits by the error-diffusion and processing portion 60h is converted again into the data of 256 gray levels.

The image processing portion 61e can perform a variety of image processing operations on the input data of pixels and collects information on an array of data, e.g., feature extraction and so on.

The variable magnification processing portion 61f receives a magnification instruction, determines the pixel data (gray level value) of each object picture element after magnification by the interpolation process with the use of the known input data, and changes the magnification of the image at first in the vertical scanning (feeding) direction and then in the horizontal scanning (processing) direction.

The gray level conversion portion 61g determines a desired ratio of an output gray level relative to an input gray level on the basis of a gray level conversion table.

The error diffusion processing portion 61h performs a processing operation similar to that of the error-diffusion processing portion 60c of the image data input portion 60.

The compression processing portion 61i compresses binary data by run length coding.

The image data output portion 62 includes the restoring portion 62a and the laser output portion 62b.

The image data output portion 62 is designed for restoring the image data stored in a compressed state in the memory 63, converting them into the image data of 256 gray levels, diffusing errors of 4-valued data to obtain more smooth gray level representation in comparison with the 2-valued data smoothing method and then transferring the processed data to the laser output portion 62b. The restoring portion 62a serves to restore the image data compressed by the compression processing portion 61i.

The laser output portion 62b turns ON and OFF laser lights according to control signals from the control CPU to represent the digital image data.

A gray level image processing method, adopted in the image processing device according to the present invention, will be described as follows:

Light reflected on the original copy creates an image in a charge coupled device (CCD) by which it is converted into an analog form. These analog signals are converted by an A-D converter into digital information signals from which original image data is extracted. The extracted image data includes pixels each having a gray level in the range of, e.g., 0 (white) to 255 (black). This means that a stream of 8 bits is required to represent each pixel. Recording the whole image requires a very large amount of storage. In addition to printing the image data it is necessary to use an image recording device that is capable of printing an image of gray levels varying from 0 to 255. The present invention, therefore, provides a gray level image recording circuit which is capable of reducing the amount of information per pixel and of decreasing the number of gray levels to the extent that is generally available to printers having a low memory capacity and that require relatively low power for reproducing the gray shades of an image.

Figures 28A, 28B:
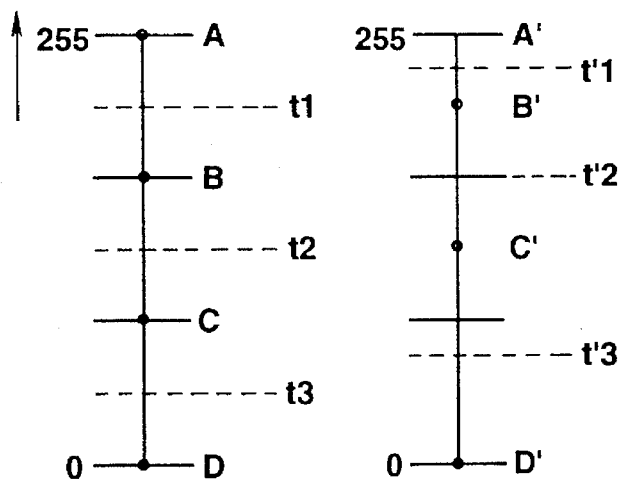
FIGS. 28A, 28B show an example of quantizing values of tonal densities of an image and thresholds.

It is assumed that the processing procedure begins with reading image data having pixels with gray levels of 0 to 255 and then quantizing the data into low values corresponding to the gray levels of 0 to 255. A method for setting up for data quantization is described as follows:

FIGS. 28A, 28B show an example of quantizing values and thresholds for representing the gray levels of the image data in mode B (character image) (FIG. 28A) and in mode A (photo image) (FIG. 28B).

First, in the mode B of FIG. 28A, certain constant thresholds t1, t2, t3 are defined and then quantizing values A, B, C and D are determined according to the following discriminants (6), where f denotes input data:

$$\left. \begin{array}{l} A \text{ if } 255 \geq f > t1; \\ B \text{ if } t1 \geq f > t2; \\ C \text{ if } t2 \geq f > t3; \\ D \text{ if } t3 \geq f \geq t0. \end{array} \right\} \quad (6)$$

Similarly, in the mode A of FIG. 28B thresholds t'1, t'2, t'3 are defined and then quantizing values A', B', C' and D' are determined according to the above discriminants (6).

The mode B of FIG. 28A is used for copying a binary image originally containing characters and the like. The quantizing values A, B, C, D and thresholds t1, t2, t3 are selected at substantially even intervals respectively from a pixel gradation curve. On the other hand, in the mode A of FIG. 28B, the quantizing values A', B', C', D' and thresholds t'1, t'2, t'3 are selected so that the quantizing values may be proportional to the gray levels of the image to get a more faithful representation of the original copy. For instance, thresholds t1'=224, t2'=161, t3'=64 in the mode A and t1=212, t2=128, t3=42 in the mode B are selected; and quantizing values A'=255, B'=192, C'= 128, D'=0 in the mode A and A=255, B=170, C=85, D'= 0 in the mode B are applied.

Figure 29A:
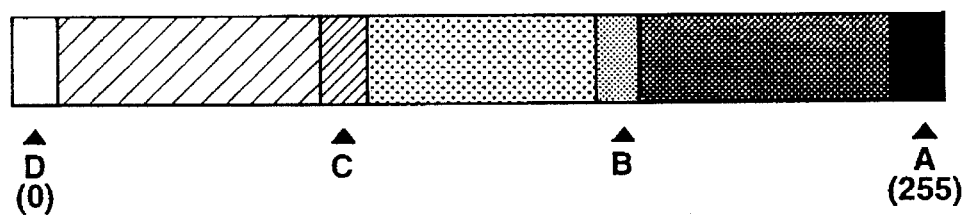
FIGS. 29A, 29B show gradations obtainable by copying modes.
Figure 29B:
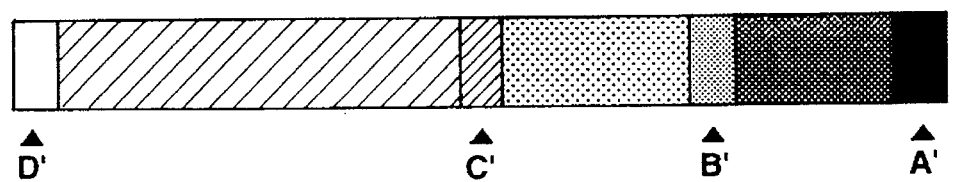

FIGS. 29A, 29B show gradation charts for copying modes A (chart b) and B (chart a). In FIGS. 29A, 29B, the quantizing values D and D' correspond to a white image (0) and the quantizing values A and A' correspond to a black image (255).

Figures 30A, 30B:
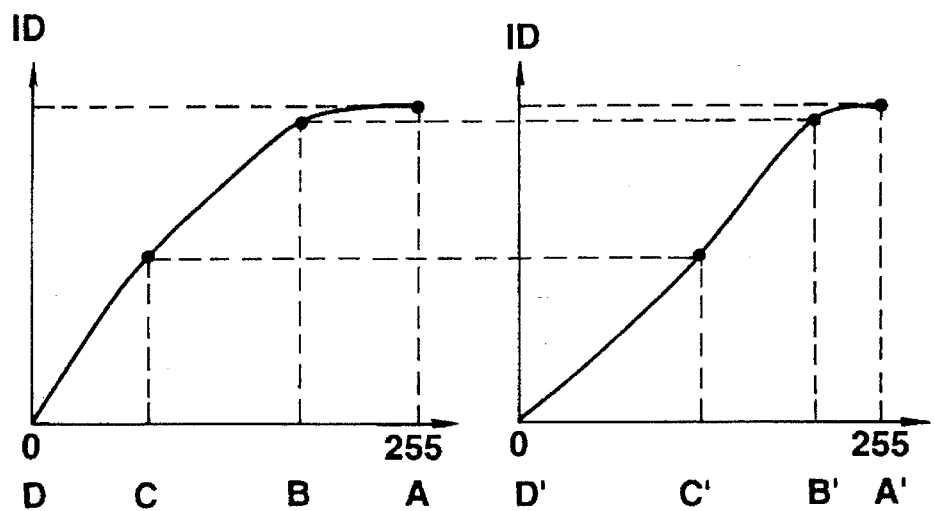
FIGS. 30A, 30B show variations of the gradations shown in FIG. 29 and characteristic curves of tonal density.

FIGS. 30A, 30B show variations of the gradation charts shown in FIGS. 29A, 29B and characteristic curves of tonal density. FIG. 30A indicates the curve obtained in mode B and FIG. 30B indicates the curve obtained in mode A. In each graph, the tonal density (ID) is plotted along the ordinate and the quantized value is plotted along the abscissa. While the FIG. 30B for the mode A indicates a linear change of the tonal density curve with a change in the gradation, FIG. 30A for mode B indicates the saturation of the curve with a rise in the gray level. These curves were obtained by measuring the tonal densities of the printed images by the use of a Macbeth densitometer. In these cases, input data containing pixels each having any gray level in a range from 0 to 255 were processed for gray levels and then printed. For instance, in the case of an input image of gray level of 100, its printing density ID can be found at a point on the abscissa corresponding to the point 100 on an ordinate.

FIGS. 31A, 31B, 31C, 31D are a view for explaining an example of gray level image processing, according to the present invention, when changing the tonal densities of input signals in the copying modes A and B. In FIGS. 31A, 31B, 31C, 31D, the same image divided into 10×10 dots (pixels) of input gray levels of 100 or 200 are quantized by applying quantizing values and thresholds defined in mode A (FIG. 28B) and mode B (FIG. 28A) respectively. In the case of an input image having a low gray level of 100 the gradation of middle portion dots is expressed by 0, 1 and 2 and shows a large change in both modes A and B. In the case of an input image having high gray levels of 200 the gradation of the middle portion dots is expressed by 2 and 3 and shows a small change.

However, any image that is only quantized can not faithfully represent the original tonal density of small local areas thereof and may lack the gradual passing from one shade to another. To eliminate this, the difference between the tonal densities of an image and an original copy, which is caused by the process of quantization, is measured as a quantizing error that is so processed as to have an effect on the gray levels of pixels around an attentional one within the image. The principle of this processing will be described as follows:

In the case of pixels of low gray level, steps 1 and 2 are conducted separately.

Figure 32:
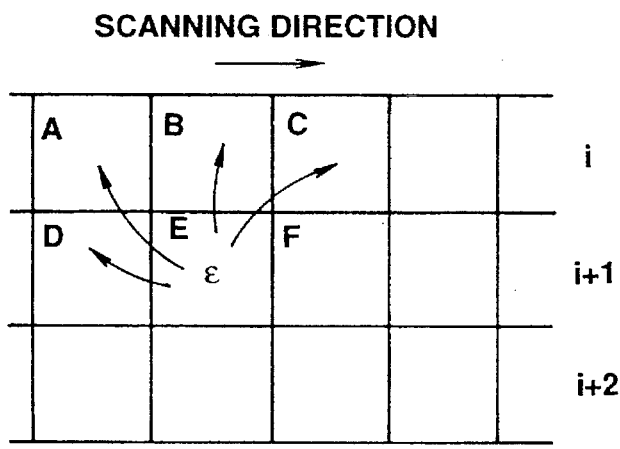
FIG. 32 shows a method of step 1 to distribute a quantization error $\epsilon$ of an attentional pixel to surrounding pixels.
Figure 33:
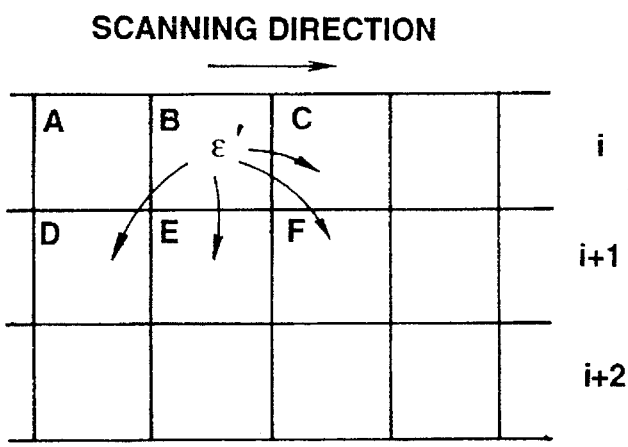
FIG. 33 shows a method of step 2 to distribute a quantization error $\epsilon$ of an attentional pixel to surrounding pixels.

FIG. 32 shows a method of step 1 to distribute a quantization error $\epsilon$ of an attentional pixel to surrounding pixels. The step detects an error $\epsilon$ at an attentional pixel E on i+1st line and distributes it in a specified ratio to pixels A (above left), B (directly above) and C (above right) on ith line above the i+1st line and pixel D located left and is scanned directly before the attentional pixel E on the i+1st line. Upon completion of the error distributions from all attentional pixels on the i+1st line to all pixels on ith line, step 2 moves the processing to ith line and distributes the error of each attentional pixel to pixels on the i+1st line. The operation of step 2 is as follows:

FIG. 33 shows a method of step 2 to distribute a quantization error $\epsilon$ of an attentional pixel to surrounding pixels.

Step 2 distributes an error $\epsilon'$ defined at an attentional pixel B on ith line in a specified ratio to pixels D (below left), E (directly below) and F (below right) on i+1st line below the ith line and pixel C located right and scanned directly after the attentional pixel B on the ith line. Step 2 is conducted successively at all attentional pixels on the same line. Thus re-quantized values are considered final. The residual error determined by calculation is assigned to one of C, D, E and F to be designated by the use of a random number.

Step 1 is performed at i+2nd line in a similar way as the above mentioned, and then step 2 is conducted. These steps are repeated until the last data of an image is processed.

Figure 34:
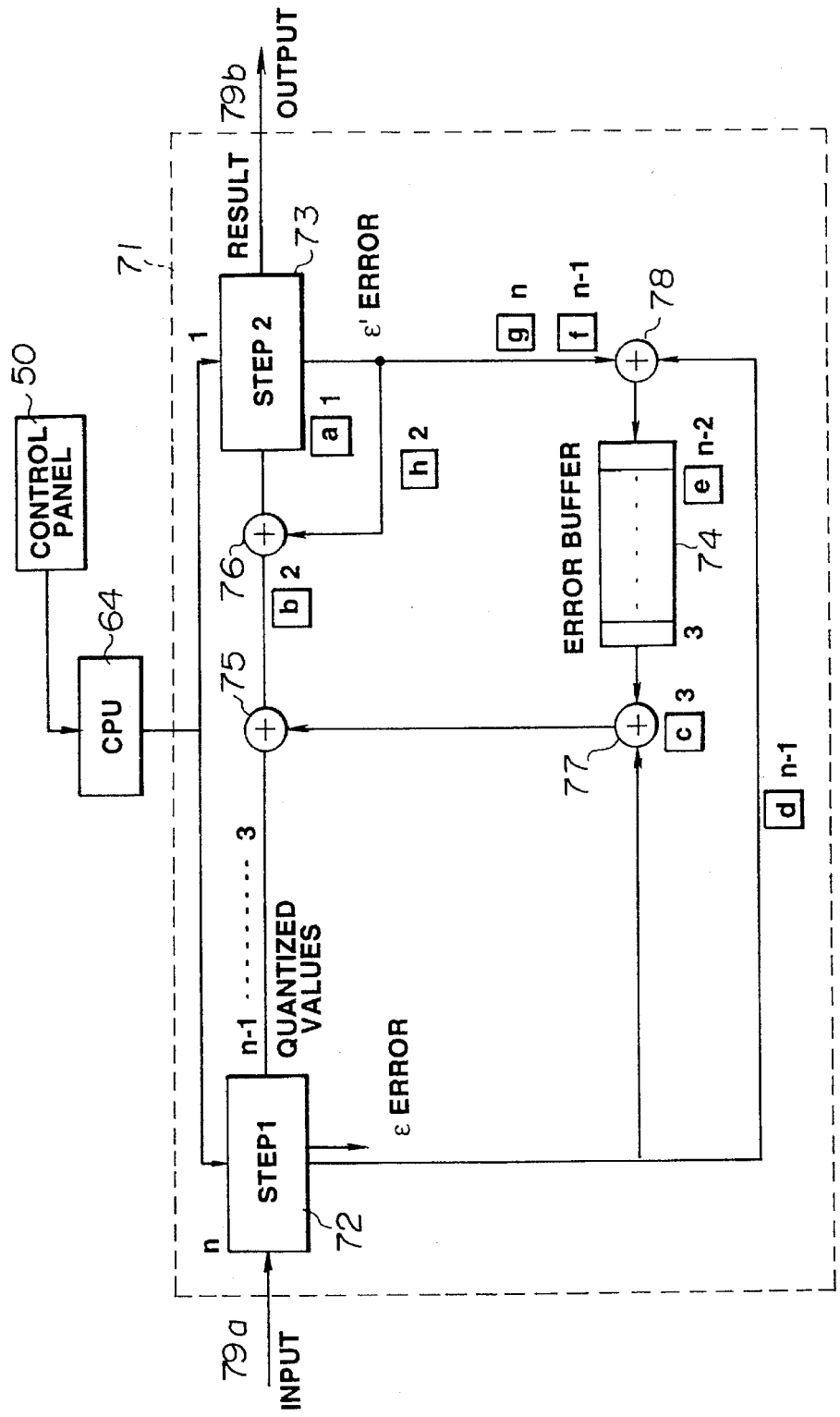
FIG. 34 is a block diagram of a gray level image processing circuit in an image recording device according to the present invention.

A gray level image processing circuit which performs the above-mentioned eFFOF distributing operations of steps 1 and 2 is described as follows:

FIG. 34 is a block diagram of a gray level image processing circuit used in an image recording device according to the present invention. In FIG. 34, there is shown a gray level image processing circuit 71, a 1st step processor 72, a 2nd step processor 73, an error buffer 74, adders 75, 76, 77, 78, an input unit 79a and an output unit 79b. According to a mode selector signal "mode A" 57a or "mode B" 57b on the control panel 50, a central processor unit (CPU) 64 sets quantizing values and thresholds suitable for the selected mode at the first step processor 72. Input data having gray levels of, e.g., 0 to 255 (8 bits per pixel) is input through the input unit 79a into the 1st step processor 72 wherein gray levels of each pixel is quantized and, at the same time, an error ε of quantized data is determined by comparing the data with the input data. The error ε is distributed by the 1st step processor 72 in the above-mentioned manner (step 1).

Figure 35:
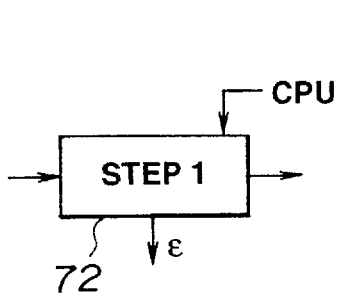
FIGS. 35A, 35B are a view for explaining the distribution of a quantization error a at step 1.
Figure 35:
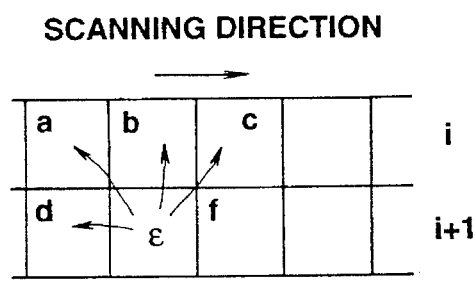

FIGS. 35A, 35B is a view for explaining the distribution of a quantization error "e" by the 1st step processor 72. FIG. 35A shows an input signal and an output signal of the 1st step processor 72. FIG. 35B indicates how to distribute an error among pixels. The input data from the input unit 79a (FIG. 34) enters the 1st step processor 72 (FIG. 35) which performs the operations of step 1, as shown in FIG. 35(b), to re-quantize the pixels in the shown direction (from left to right). A quantization error ε of an attentional pixel on an i+1st line is distributed to pixels a (above left), b (directly above) and c (above right) on an ith line and pixel d on the i+1st line. Error values assigned to the pixels a, b, c on the ith line in the directions a, b, c and are each subsequently added by adder circuits 75, 76 and 77 to the 2nd step processor 73 for further processing therein. An error assigned to the pixel d is added to the error buffer 74 through an adder circuit 78.

Figure 36:
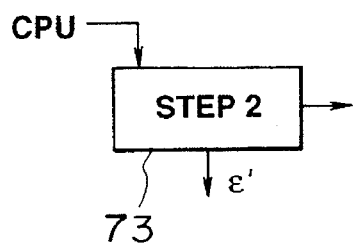
FIGS. 36A, 36B are a view for explaining the distribution of a quantization error $\epsilon$ at step 2.
Figure 36:
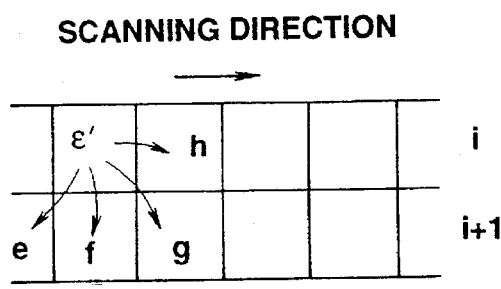

FIGS. 36A, 36B are a view for explaining the distribution of a quantization error ε at step 2. FIG. 36A shows an input signal and an output signal of the 1st step processor 72. FIG. 36B indicates how to distribute an error among pixels. As shown in FIG. 34, the 2nd step processor 73 generates an image data corrected for quantization errors through the output unit 79b. The 2nd step processor 73 performs the operations of step 2, as shown in FIG. 36B, to requantize the pixels. A quantization error ε' of an attentional pixel on an ith line is distributed to pixels e (below left), f (directly below) and g (below right) on an i+1st line and a subsequently sampled pixel h on the ith line. Error values assigned to the pixels e, f, g on the i+1st line in the directions e, f, g are added subsequently to the error buffer 74 through the adder circuit 78 and an error value assigned to the pixel h on the ith line is added to the 2nd step processor through the adder circuit 76.

Figure 37:
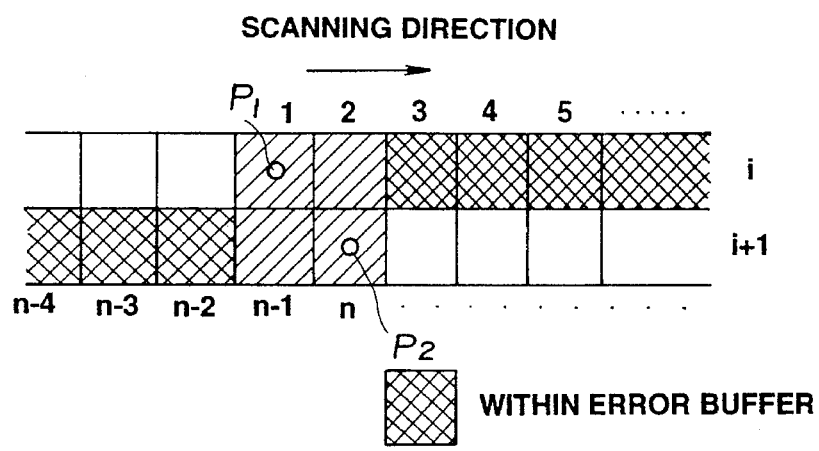
FIG. 37 is a view for explaining gray level image processing.
Figure 38:
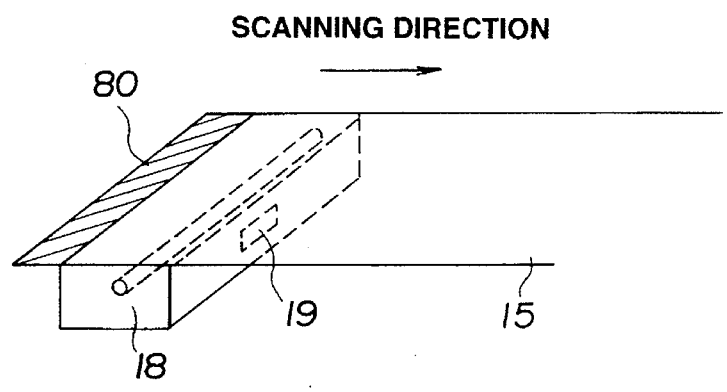
FIG. 38 shows how to expose a document in a copying machine.

FIG. 37 is a view for explaining gray level image processing. There is shown a flow of operations of the 1st step processor 72 and the 2nd step processor 73 on attentional pixels sequentially selected in numerical order to the last objective one. An error of the attentional pixel n (denoted by P2) to be currently processed on a i+1st line is distributed to pixels 1 (above left), 2 (directly above) and 3 (above right) on an ith line and to pixel n−1 directly ahead on the i+1st line and the error values assigned to pixels 1, 2 and 3 are added subsequently to the 2nd step processor 73 and the error value assigned to the pixel n−1 is added to the error buffer 74 through the adder circuit 78. Then, the error buffer 74 transfers an error value corresponding to that of the pixel 3 (above right) through the adder circuit 77 to the pixel 3 for correction. Similarly, the 2nd step processor 73 finally sends the error value of a pixel n−2 to the error buffer 74 after the distribution of an error of an attentional pixel 1 indicated by P1. The objective pixel is thus changed from the last processed attentional pixel to the next one in numerical order through the interactions of the 1st step processor 72 and the error buffer 74 to realize the successive processing of gray levels of a whole image.

The following description is concerned with how to change thresholds if an ambient condition changes.

A practical example of an ambient condition change is a change in the luminosity of an exposure light source. The luminosity of an exposure lamp changes with the time of its operation, causing a change in gray levels of the image data sampled from an original copy. Therefore, in the case of a change in brightness due to exposure to light, it is desirable to change the quantizing values and the thresholds to assure that the image has suitable gray levels.

FIG. 88 shows how to expose a document in a copying machine. In image scanning, a lamp reflector assembly 18 containing an exposure lamp moves along the bottom surface of the transparent glass plate 15, making a charge coupled device (CCD)19 read an original document placed on the top surface of the glass plate and, at the same time, read a reference white document 80 placed at an end portion of the transparent glass plate 15. This reference white document is every time scanned together with the original to be printed. The sampled white image data serves as a reference white data. However, the reference white data may change when the exposure light changes its luminosity.

Figure 39:
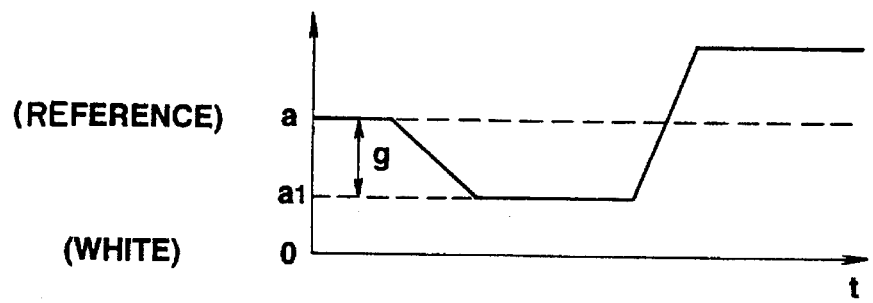
FIG. 39 shows an example of a variation of reference data (white image) with time elapsed.

FIG. 39 shows an example of a variation of reference data (white image) with time elapsed. This reference white may have a change with time of the exposure lamp operation. The present invention proposes to sense such a change of the reference white and to change quantizing values and thresholds set in the gray level image processing circuit. In short, before scanning the original, the reference white image is sampled. The resulting data "a1" is compared with the stored reference white data "a" by the CPU 64 of the image data processing portion 61 (FIG. 27) to obtain a difference "g" according to which new quantizing values and thresholds are defined for use.

Figure 40:
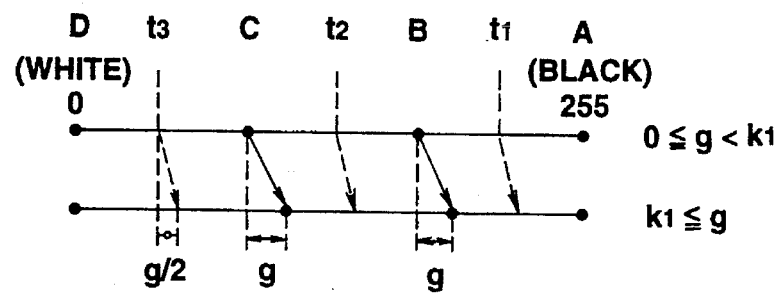
FIG. 40 is a view for explaining how to reset quantize values and thresholds.

FIG. 40 is a view for explaining how to reset quantizing values and thresholds. The above-mentioned difference "g" is determined according to the following equation (7):

$$a1-a=g \qquad \ldots (9)$$

If the difference value "g" is larger than a constant K1 determined by a limit in error, quantizing values B and C shall be changed by the value "g" in the positive (+) direction and then thresholds t1, t2, t3 shall be changed by a half of value "g" (g/2) in the positive direction. If the value "g" is smaller than a constant −K1, the quantizing values and the thresholds shall be changed by the above-mentioned values in a negative (−) direction.

Figure 41:
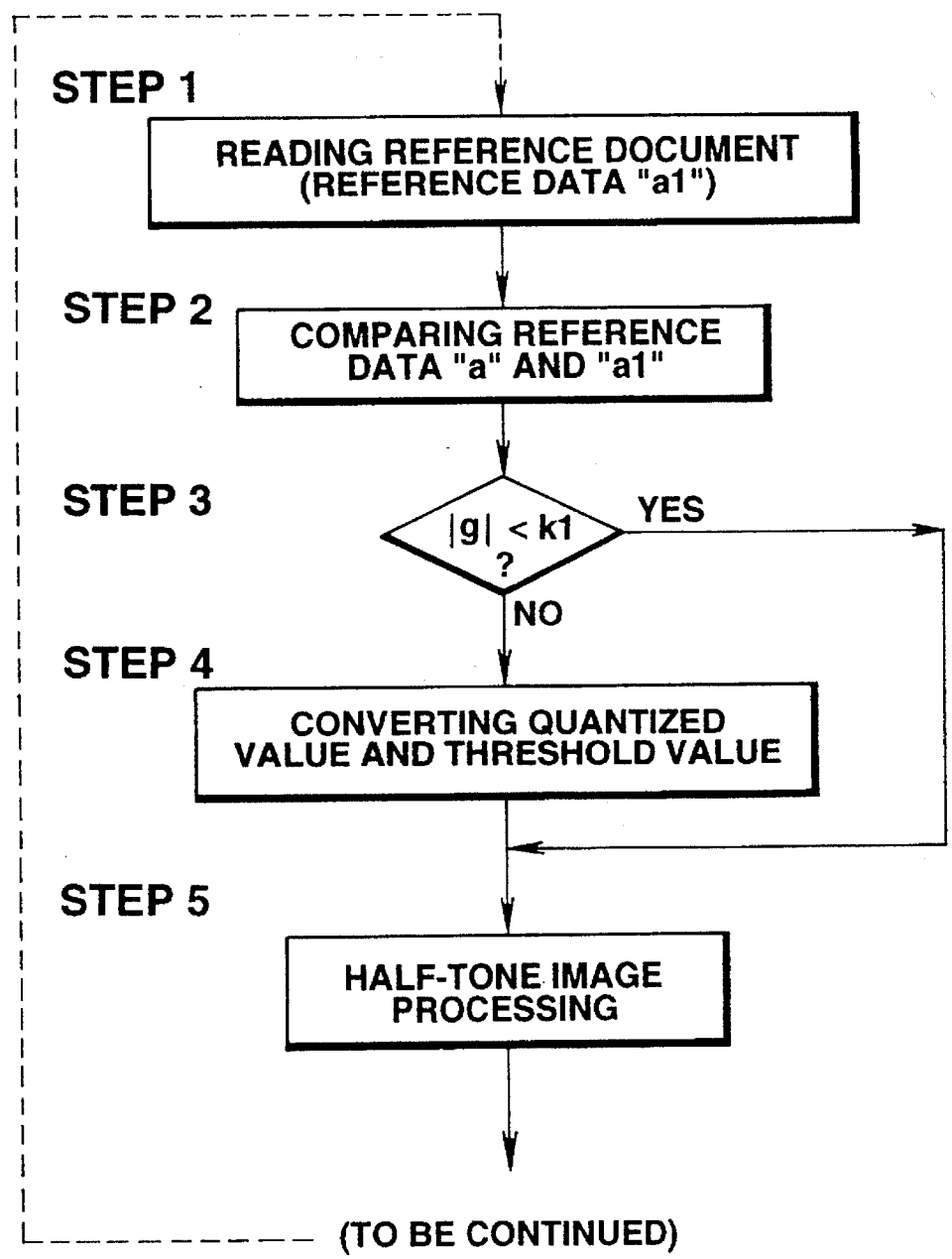
FIG. 41 is a flow chart for changing quantize values and thresholds according to the present invention when a reference value is changed under the influence of the environment.

FIG. 41 is a flow chart for changing quantizing values and thresholds according to the present invention when the reference white value is changed under the influence of the environment. The procedure is as follows:

Step 1: When an image is scanned, the reference document (white) is also read and the reference data "a1" is stored.

Step 2: The reference data "a1" is compared with the reference data "a" initially read and stored.

Step 3: An absolute value of a difference "g" between two reference data "a1" and "a" is compared with a limited error value K1.

Step 4: If the difference "g" is larger than the constant K1, each quantizing value is corrected by the value "g" and each threshold is corrected by the value "g/2" in the positive (+) direction. If the value "g" is smaller than a constant −K1, each quantizing value and threshold are corrected in a negative (−) direction.

Step 5: When the absolute value of the error "g" is smaller than the constant K1 and the correction is finished at step 4, the processing of gray levels of the image is conducted according to the corrected values.

The same steps may be made on the next original copy after the completion of the above-mentioned operations.

As described above, the present invention provides a gray level image processor capable of changing quantizing values and thresholds according to the kinds of original images to be processed and of sensing a change in the reference data by the effect of change of the ambient conditions and by correcting the quantizing values and the thresholds, thereby obtaining an increased and stabilized quality of images without being effected by a change in the ambient conditions.

However, there is still problem that, for example, any copying machine may change its characteristics during a long period of operation or due to aging even under constant ambient conditions. For instance, in the copying machine, fogging may be caused by the effect of ambient conditions (e.g., a temperature change or the deterioration of the developer) as well as it may occur due to the wearing out of the light-sensitive layer of the light-sensitive drum: in this case, charging voltage drops and a difference between the charging voltage and the bias voltage for toner image development decreases, resulting in fogging on the printed image of a low gray level. The present invention also provides a means to obtain a stabilized quality of printed copies even in the above-mentioned case.

Figure 42:
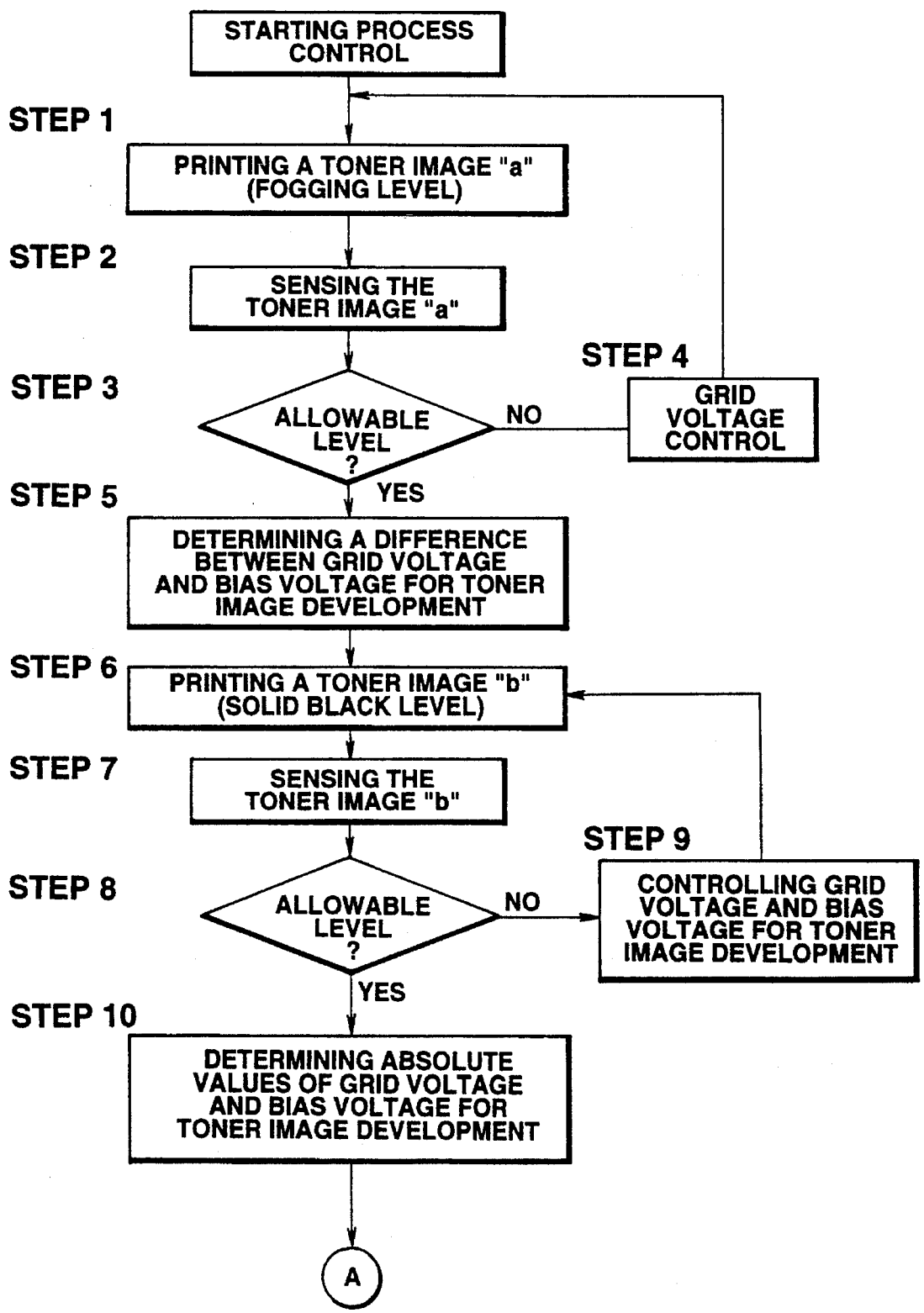
FIG. 42 is a flow chart 1 for explaining another example of an image processing device according to the present invention.

FIGS. 42 and 43 are flow charts for explaining another example of an image processing device according to the present invention. Two flow charts of FIGS. 42 and 43 are interconnected at point A. Referring to the flow charts, the operations of the image processor will be explained below. A copying machine, wherein the image processor is operating, is of the digital type that has a light-sensitive drum whose polarity of charges is the same that the charged toner has. The flow chart describes the operation of the image processor after the process control of the copying machine has started.

To prevent occurrence of fogging at low tonal density of an image for image processing, the image processing device according to the present invention includes a 1st stage control to determine a potential difference between a charging voltage and a bias voltage for toner image development, at which the fogging can not be caused, a 2nd stage control to increase absolute values of the charging voltage and the bias voltage keeping the constant potential difference, and a 3rd stage control to adjust at least two thresholds and quantizing values at gray level of an image.

1st stage control

Step 1: A toner image "a" containing reference gray level data is formed on a light-sensitive drum 25 to check and control low density fogging.

Step 2: A reflection factor being a function of tonal density of the toner image "a" is measured by the use of an optical reader 25a.

Step 3: The level of low density fog (i.e., ground fog) is judged to be allowable or not.

Step 4: If the fogging level is not allowable, the charging voltage is increased. Fog is reduced since the bias voltage for toner image development is fixed.

Step 5: In the case of the fogging level being allowable, a potential difference between the charging (grid) voltage and the bias voltage for development is determined at this step.

2nd stage control: the following operations will be performed subsequent to the operation of Step 5:

Step 6: A toner image "b" representing a solid black level is formed on a light-sensitive drum 25.

Step 7: The tonal density of the toner image "b" is measured by using the optical reader 25a.

Step 8: The level of high tonal density, i.e., the black level is judged whether it is allowable or not.

Step 9: If the black level is not allowable (i.e., the black is not reproduced as black), the absolute values of the charging voltage and the bias voltage are increased on the condition that the potential difference between both voltages is kept at a fixed value determined by the first stage control. Black level rises because the light-sensitive body may more easily attract toner thereto as a difference between a potential at its bright portion exposed to laser light and a bias potential for development increases.

In this case it is necessary to increase the absolute values of both charging voltage and bias voltage without changing the potential difference between them because by increasing only the bias voltage results in reoccurrence of fogging. This operation shall be repeated until the black image attains an allowable level.

Step 10: When the toner image "b" gets to an allowable density level, the absolute values of the charging voltage and the bias voltage for development are determined.

3rd stage control:

The 1st stage and the 2nd stage control achieve the correction of fogging and black levels. The 3rd stage control is intended to set gray levels of an image. In conventional analog copying machines, gray level control is achieved by changing the luminosity of a copy lamp. This method, however, can adjust only one point of gray levels. The present invention provides the possibility of adjusting at least two gray levels of a gray level image. The following flow chart describes the case of adjusting three gray levels.

Step 11: Gray level toner images $c_1$, $c_2$, $c_3$ previously set on a light-sensitive drum 25 are printed.

Step 12: Three gray levels of the toner images $c_1$, $c_2$ and $c_3$ are measured by the use of an optical reader 25a.

Step 13: The gray level of the toner image $c_1$ is evaluated as to whether it is allowable or not.

Step 14: If the gray level of the toner image $c_1$ is not allowable, a threshold $t_1$ is adjusted until the toner image $c_1$ attains the allowable gray level.

Step 15: After completion of the gray level adjustment of the toner image $c_1$, the gray level of the toner image $c_2$ is evaluated as to whether it is allowable or not.

Step 16: If the gray level of the toner image $c_2$ is not allowable, a threshold $t_2$ is adjusted until the toner image $c_2$ attains the allowable gray level.

Step 17: After completion of the gray level adjustment of the toner image $c_2$, the gray level of the toner image $c_3$ is evaluated as to whether it is allowable or not.

Step 18: If the gray level of the toner image $c_3$ is not allowable, a threshold $t_3$ is adjusted until the toner image $c_3$ attains the allowable gray level. After this, operations from step 11 to step 18 are repeated again.

Step 19: All the toner images $c_1$, $c_2$, $c_3$ are evaluated as to whether they obtain the allowable levels or not. If not, steps 11–19 are repeated again.

Step 20: The process control of the copying machine is finished when the gray level toner images $c_1$, $c_2$ and $c_3$ obtain the allowable gray levels.

As mentioned above, the quantizing values and the thresholds are changed according to the differences between the predetermined data of specified gray levels and the data of gray levels read from the reference toner images a, b, $c_1$, $c_2$ and $c_3$ are created on the light-sensitive drum 25. In the case of the gray level image processor of FIG. 34, the difference between a reference toner image and a specified gray level is used by CPU 64 to change the thresholds and quantizing values of steps 1 and 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An image processing device comprising:

image data input means for quantizing image data of an original image;

image data processing means for performing final conversion of the quantized image data;

memory means for storing the converted image data processed by said image data processing means; and image data restoring means for restoring the converted image data stored in said memory means and for diffusing errors of the restored image data for gray level representation, said image data restoring means having arithmetic and logic means for performing operations on inter-pixel spacing for a unit of two or more pixels of the error-diffused restored image data so that inter-pixel spacing between adjacent pixels is constant.

2. The image processing device according to claim 1, wherein said arithmetic and logic means comprises edge discriminating means for determining whether or not adjacent pixels of the unit of two or more pixels of the error diffused restored image data in which inter-pixel spacing operations are performed correspond to an edge portion of the original image.

3. The image processing device according to claim 2, wherein said edge discriminating means comprises a first discriminator for discriminating an edge portion in a horizontal scanning direction of the unit of two or more pixels and a second discriminator for discriminating an edge portion in a vertical scanning direction of the unit of two or more pixels.

4. The image processing device according to claim 2, wherein said arithmetic and logic means performs operations on inter-pixel spacing when said edge discriminating means determines that adjacent pixels do not correspond to an edge portion of the original image to minimize an effect of variation of spacing of printing drive pulses for driving a printer upon recording of the original image data and to improve gray level representation.

5. The image processing device according to claim 2, wherein said arithmetic and logic means performs enhancement on adjacent pixels when said edge discriminating means determines that adjacent pixels correspond to an edge portion of the original image.

6. The image processing device according to claim 2, further comprising:

designation means, manually operable by a system user, for designating whether the original image is a photograph, contains character data only or contains both a photograph and character data and for generating a mode signal indicative of the designation, said arithmetic and logic means performs a) operations on inter-pixel spacing of the error-diffused restored image data, when the mode signal is indicative that the original image is a photograph, b) operations on inter-pixel spacing of the error-diffused restored image data when said edge discriminating means determines that adjacent pixels do not correspond to an edge portion of the original image and enhancement on adjacent pixels when said edge discriminating means determines that adjacent pixels correspond to an edge portion of the original image, when the mode signal is indicative that the original image contains both a photograph and character data, and c) no operations when the mode signal is indicative that the original image contains character data only.

7. The image processing device according to claim 2, wherein said edge discriminating means sets an area of the error diffused restored image data larger than two attentional pixels in a processing scanning direction, divides the area into divided areas, determines a total of quantized values of the pixels of each of the divided areas, determines a difference between a maximal total quantized value and a minimal total quantized value of the divided areas, and judges that the attentional pixels relate to an edge portion of the error diffused image data in the processing scanning direction if the difference is larger than a specified value or that the attentional pixels relate to a non-edge portion if the difference is smaller than the specified value.

8. The image processing device according to claim 7, wherein said arithmetic and logic means performs operations on inter-pixel spacing when said edge discriminating means judges that the attentional pixels relate to a non-edge portion and performs enhancement on the attentional pixels if said edge discriminating means judges that the attentional pixels relate to an edge portion.

9. The image processing device according to claim 1, wherein the pixels of the error-diffused restored image data having constant inter-pixel spacing are aligned in a vertical scanning direction.

10. The image processing device according to claim 2, wherein said arithmetic and logic means further comprises change over means, wherein upon determination by said edge discriminating means that adjacent pixels of the unit of two or more pixels correspond to an edge portion of the original image, said change over means changes the adjacent pixels of the unit of two or more pixels to subsequent adjacent pixels of a corresponding unit of two or more pixels of the error diffused restored image data.

11. A method of image processing comprising:

(a) quantizing image data of an original image;

(b) performing final conversion of the quantized image data;

(c) storing the converted image data processed in step (b); and (d) restoring the converted image data stored in said step (c) and diffusing errors of the restored image data for gray level representation, said step (d) of restoring comprising performing arithmetic and logic operations on inter-pixel spacing of the error diffused restored image data so that inter-pixel spacing between adjacent pixels is constant.

12. The method of image processing of claim 11, wherein the arithmetic and logic operations of said step (d) comprise discriminating whether or not adjacent pixels of the error diffused restored image data correspond to an edge portion of the original image.

13. The method of image processing of claim 12, wherein the edge discriminating of said step (d) comprises discriminating an edge portion in a horizontal scanning direction of the original image and discriminating an edge portion in a vertical scanning direction.

14. The method of image processing of claim 12, wherein the arithmetic and logic operations of said step (d) further comprise performing operations on inter-pixel spacing when the adjacent pixels are discriminated as not corresponding to an edge portion of the original image to minimize an effect of variation of spacing of printing drive pulses for driving a printer upon recording of the original image data and to improve gray level representation.

15. The method of image processing of claim 12, wherein the arithmetic and logic operations of said step (d) further comprise performing enhancement on adjacent pixels when the adjacent pixels are discriminated as corresponding to an edge portion of the original image.

16. The method of processing of claim 12, wherein the arithmetic and logic operations of said step (d) comprise:

manually designating whether the original image is a photograph, contains character data only or contains both a photograph and character data, the arithmetic and logic operations comprise performing
   a) operations on inter-pixel spacing of the error diffused restored image data, when the original image data is a photograph,
   b) operations on inter-pixel spacing of the error diffused restored image data when the adjacent pixels are discriminated as not corresponding to an edge portion of the original image and enhancement on adjacent pixels when the adjacent pixels are discriminated as corresponding to an edge portion of the original image, when the original image contains both a photograph and character data, and
   c) no operations when the original image contains character data only.

17. The method of image processing of claim 11, wherein the pixels of the error-diffused restored image data having constant interpixel spacing are aligned in a vertical scanning direction.

* * * * *